US008571580B2

(12) United States Patent
Altman et al.

(10) Patent No.: US 8,571,580 B2
(45) Date of Patent: Oct. 29, 2013

(54) DISPLAYING THE LOCATION OF INDIVIDUALS ON AN INTERACTIVE MAP DISPLAY ON A MOBILE COMMUNICATION DEVICE

(75) Inventors: Samuel H. Altman, Menlo Park, CA (US); Nicholas T. Sivo, Palo Alto, CA (US)

(73) Assignee: Loopt LLC., Dover, DE (US)

( * ) Notice: Subject to any disclaimer, the term of this patent is extended or adjusted under 35 U.S.C. 154(b) by 1307 days.

(21) Appl. No.: 11/445,730

(22) Filed: Jun. 1, 2006

(65) Prior Publication Data

US 2007/0281689 A1    Dec. 6, 2007

(51) Int. Cl.
*H04W 24/00* (2009.01)

(52) U.S. Cl.
USPC .................. 455/456.3; 455/456.5; 455/456.6; 455/457; 455/466; 455/414.3

(58) Field of Classification Search
USPC .......... 455/456.3, 456.1, 456.6, 435.1, 414.2, 455/414.1
See application file for complete search history.

(56) References Cited

U.S. PATENT DOCUMENTS

| | | | |
|---|---|---|---|
| 4,939,662 | A | 7/1990 | Nimura |
| 5,086,394 | A | 2/1992 | Shapira |
| 5,320,409 | A | 6/1994 | Katoh |
| 5,754,939 | A | 5/1998 | Herz |
| 6,014,090 | A | 1/2000 | Rosen |
| 6,049,711 | A | 4/2000 | Ben-Yehezkel |
| 6,052,122 | A | 4/2000 | Sutcliffe |
| 6,061,681 | A | 5/2000 | Collins |

(Continued)

FOREIGN PATENT DOCUMENTS

| | | |
|---|---|---|
| EP | 1295500 B1 | 5/2009 |
| WO | WO0160100 A1 | 8/2001 |

OTHER PUBLICATIONS

International Searching Authority, International Search Report and the Written Opinion of the International Searching Authority for International Application No. PCT/US2007/012960, mailed Jan. 3, 2008.

(Continued)

*Primary Examiner* — Charles Appiah
*Assistant Examiner* — Khai M Nguyen
(74) *Attorney, Agent, or Firm* — Arent Fox LLP; J D Harriman

(57) ABSTRACT

Embodiments of a location-based social network manager process are described. The process is executed on a server computer coupled to a plurality of mobile communication devices over a wireless network. Each mobile device is a location-aware mobile communication device. The process determines the geographic location of a mobile communication device operated by a user within an area, displays a map representation of the area around the mobile communication device on a graphical user interface of the mobile communication device, and superimposes on the map the respective locations of one or more other users of mobile communication devices coupled to the mobile communication device over the network. The user can build a database of friends among the one or more other users whose location can be displayed on each respective mobile communication device. A privacy function allows a user to define who among his or her network of friends can view the location information of the user on their mobile communication devices. Messaging and alert functions using the communications capability of the mobile device can incorporate the location information resulting in interaction among users based on user identity as well as relative position to one another.

44 Claims, 14 Drawing Sheets

(56) References Cited

U.S. PATENT DOCUMENTS

| | | | |
|---|---|---|---|
| 6,112,186 A | 8/2000 | Bergh | |
| 6,208,934 B1 | 3/2001 | Bechtolsheim | |
| 6,272,467 B1 | 8/2001 | Durand | |
| 6,317,718 B1 | 11/2001 | Fano | |
| 6,366,568 B1 | 4/2002 | Bolgiano | |
| 6,456,854 B1 | 9/2002 | Chern | |
| 6,529,136 B2 | 3/2003 | Cao | |
| 6,529,143 B2 | 3/2003 | Mikkola | |
| 6,539,232 B2 | 3/2003 | Hendrey | |
| 6,549,768 B1 | 4/2003 | Fraccaroli | |
| 6,618,593 B1* | 9/2003 | Drutman et al. | 455/456.3 |
| 6,687,608 B2 | 2/2004 | Sugimoto | |
| 6,819,919 B1 | 11/2004 | Tanaka | |
| 6,965,868 B1 | 11/2005 | Bednarek | |
| 7,047,030 B2 | 5/2006 | Forsyth | |
| 7,071,842 B1 | 7/2006 | Brady | |
| 7,082,365 B2 | 7/2006 | Sheha | |
| 7,203,502 B2 | 4/2007 | Wilson | |
| 7,203,674 B2 | 4/2007 | Cohen | |
| 7,236,799 B2* | 6/2007 | Wilson et al. | 455/456.3 |
| 7,333,820 B2 | 2/2008 | Sheha | |
| 8,023,963 B2* | 9/2011 | Yonker et al. | 455/456.1 |
| 2002/0052786 A1 | 5/2002 | Kim | |
| 2003/0016804 A1 | 1/2003 | Sheha | |
| 2003/0036848 A1 | 2/2003 | Sheha | |
| 2003/0061211 A1 | 3/2003 | Shultz | |
| 2003/0064705 A1 | 4/2003 | Desiderio | |
| 2003/0078035 A1 | 4/2003 | Sheha | |
| 2003/0149527 A1 | 8/2003 | Sikila | |
| 2004/0054428 A1 | 3/2004 | Sheha | |
| 2005/0032527 A1 | 2/2005 | Sheha | |
| 2005/0054352 A1 | 3/2005 | Karaizman | |
| 2005/0073443 A1 | 4/2005 | Sheha | |
| 2005/0075119 A1 | 4/2005 | Sheha | |
| 2005/0101300 A1 | 5/2005 | Hon | |
| 2005/0114527 A1 | 5/2005 | Hankey | |
| 2005/0250552 A1 | 11/2005 | Eagle | |
| 2006/0047825 A1 | 3/2006 | Steenstra | |
| 2006/0270419 A1* | 11/2006 | Crowley et al. | 455/456.2 |
| 2007/0050129 A1* | 3/2007 | Salmre | 701/207 |
| 2008/0188246 A1* | 8/2008 | Sheha et al. | 455/457 |

OTHER PUBLICATIONS secretadmirer.com, screen capture using http://web.archive.org of <http://secretAdmirer.com> website, dated Dec. 2, 1998.

Lat49, screen capture of <http://lat49.com/howitworks/index.php>, dated Jun. 12, 2009.

Non-Final Office Action in U.S. Appl. No. 11/445,727, mailed Jul. 25, 2008.

Non-Final Office Action in U.S. Appl. No. 11/445,729, mailed Jun. 9, 2008.

Non-Final Office Action in U.S. Appl. No. 11/445,751, mailed Jul. 10, 2008.

International Searching Authority, International Search Report and the Written Opinion of the International Searching Authority for International Application No. PCT/IB2008/02235, mailed May 28, 2009.

Loopt: "About Loopt" Internet Article, [Online] Dec. 14, 2004, Retrieved from Internet at <http://www.loopt.com/about> on Mar. 8, 2009.

Fiercewireless: "Sprint offers Loopt's social mapping service" Internet Article, [Online] Jul. 17, 2007, Retrieved from Internet at <http://fiercewireless.com/story/sprint-offers-loopts-social-mapping-service/2007-07-17> on Mar. 8, 2009.

Schreiner, Keri: "Where We At? Mobile Phones Bring GPS to the Masses," IEEE Computer Graphics and Applications, vol. 27, No. 3, May-Jun. 2007, pp. 6-11.

Mobilaris: "Find Your Buddy is a Social Networking application" Internet Article, [Online] Jun. 7, 2007, Retrieved from Internet at <http://mobilaris.gotlandica.se/virtupload/content/27/Find_Your_Buddy.pdf> on Mar. 8, 2009.

Mobilaris: "Pacific Ocean extends technology lead by integrating MapInfo miAware? LBS Platform" Internet Article, [Online] Feb. 6, 2003, Retrieved from Internet at <http://nweb.waymaker.se/bitonline/2003/02/06/20030205BIT00440/wkr0002.pdf> on Mar. 8, 2009.

Liu, Jennifer: "BASES business competition awards $2,000," The Daily Stanford Online Edition, [Online] Apr. 11, 2005, Retrieved from Internet at <http://www.stanforddaily.com/cgi-bin/?p=1017453> on Oct. 26, 2009.

Altman, Samuel H.: "Viendo: A Mobile Entertainment Management Service," BASES Business Plan Compeition/Symposium, Apr. 9, 2005.

International Searching Authority, International Search Report and the Written Opinion of the International Searching Authority for International Application No. PCT/US2009/49956, mailed Sep. 1, 2009.

Non-Final Office Action in U.S. Appl. No. 11/881,836, mailed Jul. 23, 2009.

* cited by examiner

USER TABLE  1302

| UID | NAME | PHONE | LINKA |
|---|---|---|---|
| 1 | Illan G. | 555-1452 | A4321d74 |
| 2 | Tei S. | 555-0293 | 41chj892 |
| 3 | Dan H. | 555-2987 | qr99e7b |

LOCATION HISTORY TABLE  1304

| LINKB | LOCATION.HISTORY |
|---|---|
| b56sha12 | 32.5465,14.144 |
| 4a8hop1 | 3243.54,324.3474 |
| c48nfegp | 143554,456477 |

FIGURE 13

DISPLAYING THE LOCATION OF INDIVIDUALS ON AN INTERACTIVE MAP DISPLAY ON A MOBILE COMMUNICATION DEVICE

CROSS-REFERENCE TO RELATED APPLICATIONS

The current application is related to U.S. Patent Application entitled "Message Transmission System for Users of Location-Aware Mobile Communication Devices in a Local Area Network" filed on Jun. 1, 2006, U.S. Patent Application entitled "Mobile Dating System Incorporating User Location Information" filed on Jun. 1, 2006, and U.S. Patent Application entitled "Displaying and Tagging Places of Interest on Location-Aware Mobile Communication Devices in a Local Area Network."

FIELD

Embodiments of the invention relate generally to mobile communication networks, and more specifically, to displaying geographic locations for users on mobile communication devices.

BACKGROUND

The advent of mobile phones and associated services, such as Instant Messaging (IM) has provided a great impetus to social networking by facilitating instant and efficient communication among friends and acquaintances. Although they provide a great deal of on-demand communication capability, mobile phones and similar communication devices are still exclusively voice or text based communication devices. People who communicate using mobile phones are, by definition, usually in different geographic locations. Present mobile phone systems may facilitate the coordination of meetings and events by making it easier for people to converse while on the go, but they still involve traditional methods of communication and response. The process of two or more people getting together and coordinating their activities and schedules to interact in person still requires that the people contact one another and ask who is where, and what is going on when. For a network of even a few friends, this can require several phone calls or message sessions to coordinate an activity.

What is needed, therefore, is a mobile communication system that facilitates social interaction and activity coordination by incorporating location information as part of the mobile phone communication.

SUMMARY OF THE INVENTION

Embodiments of a location-based social network manager process are described. The process is executed on a server computer coupled to a plurality of mobile communication devices over a wireless network. At least some of the mobile devices are location-aware mobile communication devices. The process determines the geographic location of a mobile communication device operated by a user within an area, displays a map representation of the area around the mobile communication device on a graphical user interface of the mobile communication device, and superimposes on the map the respective locations of one or more other users of mobile communication devices coupled to the mobile communication device over the network. The user can build a database of friends among the one or more other users whose location can be displayed on each respective mobile communication device. Robust privacy features allow users to define who among his or her network of friends can view the location information on their mobile communication devices. Messaging and alert functions using the communications capability of the mobile device can incorporate the location information resulting in interaction among users based on user identity as well as relative position to one another. Other location-based items, such as places of interest, events, and the like can also be displayed on each respective user's mobile communication device.

BRIEF DESCRIPTION OF THE DRAWINGS

Embodiments are illustrated by way of example and not limitation in the figures of the accompanying drawings, in which like references indicate similar elements and in which:

FIG. 13 illustrates an example of a user table and an associated location history table, under an embodiment.

DETAILED DESCRIPTION

Embodiments of a location-based social network system and mobile communication device that incorporates a real-time map display are described. In the following description, numerous specific details are introduced to provide a thorough understanding of, and enabling description for, embodiments of the system. One skilled in the relevant art, however, will recognize that these embodiments can be practiced without one or more of the specific details, or with other components, systems, and so on. In other instances, well-known structures or operations are not shown, or are not described in detail, to avoid obscuring aspects of the disclosed embodiments.

Figure 1:
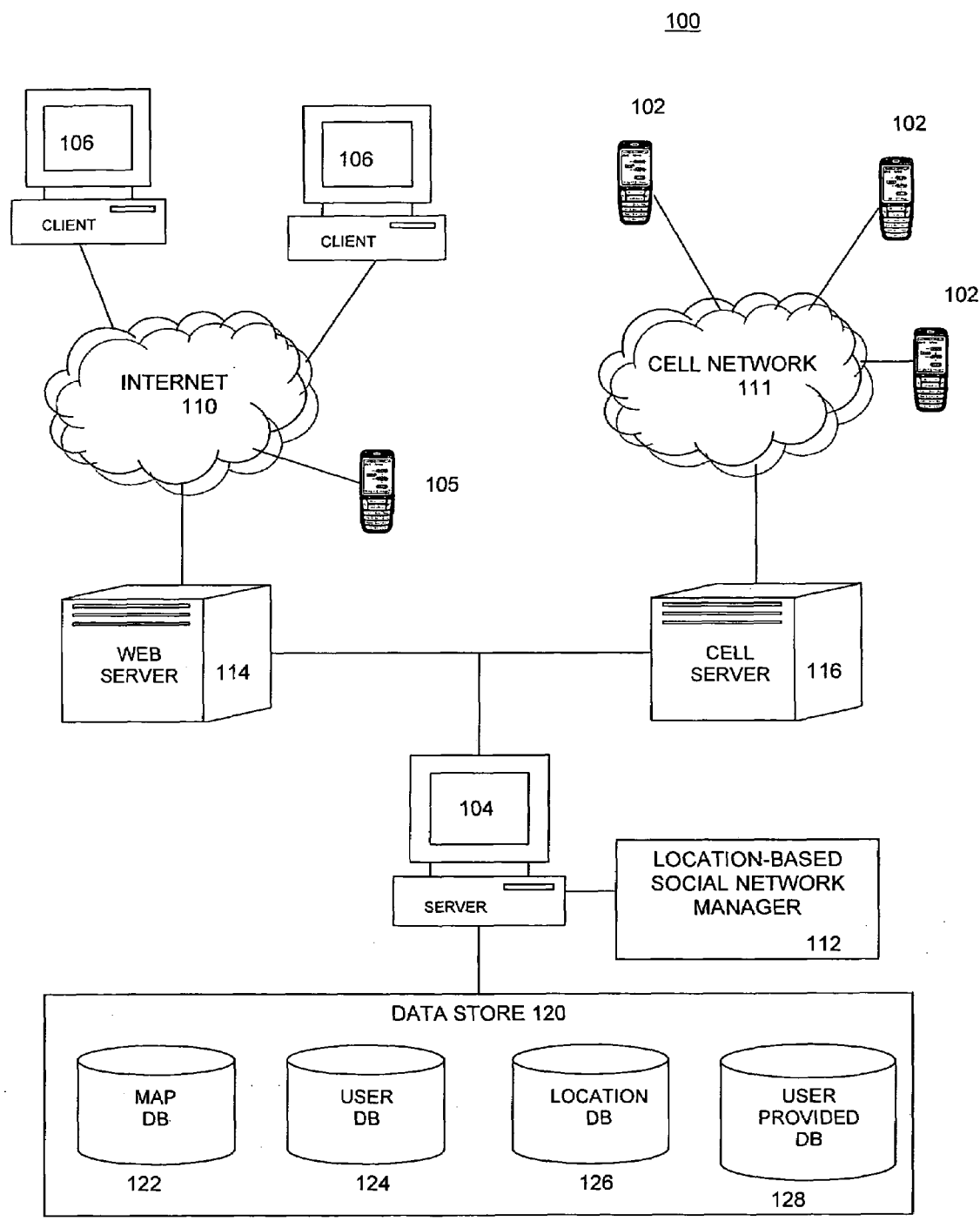
FIG. 1 is a block diagram of a mobile communication and computer network that implements embodiments of a location-based social network system.

Embodiments are directed to a location-based social network system that enables the display of maps and real-time location information on mobile phones and similar communication devices. FIG. 1 illustrates a communication and computer network system 100 that implements one or more embodiments. In system 100, a plurality of mobile communication devices, such as cell phones or similar devices 102 are coupled to a communication network, such as cell network 111. The mobile communication devices (or "mobile devices") are each carried and operated by a user and communicate with one another using known communication methods such as wireless telephony, radio, satellite, cellular systems (e.g., GSM, CDMA, and so on), or other similar systems. For the embodiment exemplified by FIG. 1, the mobile communication devices are cellular phones and the network coupling these devices is a cellular telephone network, although it should be noted that any other type of wireless network that supports mobile devices can also be used.

In one embodiment, a server computer 104 runs a location-based social network manager process 112. This process controls various data objects relating to one or more social parameters or characteristics of the users of the mobile devices 102. The users of the mobile devices form a group or number of subgroups of people who desire to interact with one another on a social level by communicating with one another, participating in activities, sharing information or experiences, or other types of social or professional interaction based on their location. Because the users of the mobile devices are inherently transitory, a fundamental data object associated with each of the users of the mobile devices is the location of each user within a particular region. Other parameters include the profile of each user, and the preferences of each user with respect to activities, people, privileges, and so on. Each user who desires to interact with other users in the system using this data utilizes the location-based social network manager process 112. Through a subscription, or similar membership-type (free or fee-based) participation model, each user registers with the server computer 104 by providing certain information relating to the user. Each principle parameter or characteristic for each user is stored in one or more databases accessible to the server computer 104. For the embodiment of FIG. 1, the data objects are stored in a data store 120 and are organized in databases for user profiles 124, user locations 126, user provided data 128, and map tiles 122. The mobile network 111 supporting the mobile devices 102 are coupled to the server computer through an intermediate server computer, such as cell server 116.

In one embodiment, each user of a mobile device may also operate or access the location-based social network manager process 112 through a client computer 106, or any device that can access the Internet, such as a WAP (Wireless Application Protocol) device 105. The client computer 106, or similar device 105 (hereinafter also referred to as a "client computer"), facilitates the establishment and management of each user's account on the server computer by providing a comprehensive interface to the databases and processes provided on the server computer 104. For the embodiment shown, the client computer interface supported by the server computer is a World-Wide Web (WWW) based interface through a web server 114 to the network 110 that supports the client computers 106. Thus, for this embodiment, the web server 114 is a server or process that stores data in the form of web pages and transmits these pages as Hypertext Markup Language (HTML) files over the Internet 110 to the client computers 106. For this embodiment, the client computers typically run a web browser program to access the web pages served by the web server 114 and any available content provider or supplemental server that may also be coupled to the network. The client computers may access the Internet 110 through an Internet Service Provider (ISP). It should be noted that network 110 may be the Internet, a Wide Area Network (WAN), a Local Area Network (LAN), or any combination thereof.

As shown in FIG. 1, aspects of the one or more embodiments described herein may be implemented on one or more computing devices executing software instructions. The server computer 104 is typically a server or workstation class computer, but can be any type of computing device with sufficient power and resources. The client computer 106 or 105 can be any type of personal computing devices, such as a workstation, personal computer, notebook computer, mobile communication device, game console, camera, personal digital assistant (PDA), or any device with an appropriate amount of processing capability. Likewise, each mobile device 102 can be a mobile computing device, such as a mobile phone, PDA, notebook computer, game console, or any similar class of mobile computing device with sufficient processing and communication capability to interact with other devices over network 111.

As shown in FIG. 1, server computer 104 runs a server-side location-based social network manager process 112. The client computers 106 may run a client side version of this program, or they may access executable program components over the network 110, such as through web browser. Data for any of the clients 106 or mobile devices 102 may be provided by a data store 120 that is closely or loosely coupled to any of the server 104 and/or each network 110 and 111. A separate content provider computer may provide some of the data that is associated with the social network manager program 112. Although data store 120 is shown coupled to the network server 104, it should be noted that content data may be stored in or more data stores coupled to any of the computers of the network, such as a network client 106 or to devices within the network 110 itself.

In one embodiment, the location-based social network manager process 112 contains one or more program components that perform the tasks of displaying location and user profile information related to each mobile communication device that is part of the network, on each mobile device and client computer, and facilitating communication between devices based on the location information. The process also includes a database manager program that manages the different databases stored in data store 120. It should be noted that the various databases 122 to 128 shown in data store 120 can be organized as separate databases, portions of a single database, or any other logical structure appropriate for storing the data.

As illustrated in FIG. 1, data store 120 stores user information in user database 124. This information relates to each user of a mobile device 102 and includes basic information, such as the user's name, identifier (nickname or "uid"), security check information (e.g., date of birth, mother's maiden name), and so on. Depending on the social network services provided by the system, this database can also store the user's social and consumer preference information, such as what type of people the user is interested in meeting or dating, what types of food or events the user prefers, and so on. The user provided database 128 stores graphic information related to each user, such as the user's picture, and any other associated images. These images can be displayed on the other user's mobile devices to provide a visual reference for each user. The user provided database can also store other data objects, such as video clips, audio clips, hypertext links, documents, or other data provided by or associated with the user. Location information for each user, such as location histories, frequently visited areas, and so on, is stored in the location database 126. A map database 122 can also be included. This database provides the background maps that are displayed on each user's mobile device and correspond to an area or region around the user at the time the user invokes the process. In one embodiment, the map images comprise map tiles that are image files of maps with varying degrees of granularity. For example, a map tile of the United States may provide an image of the continental U.S. that can be zoomed to display a regional street level map for any area in the U.S. The maps may be stored locally within the data store 120 to be provided by the server 104 to the appropriate mobile device 102, or they may be provided by a third party map provider. Other databases storing information relating to the user's of the system and the areas of their operation can also be included in data store 120, such as an events database, a place of interest database, a store finder database, and the like.

Social Networking

In one embodiment, each user of a mobile device 102 maintains an account on the server computer 104 that is set up and maintained through a subscription or similar membership mechanism. This account allows each user to define their own profile and preference data and define the boundaries of interaction with the other users in the system. The server computer 104 may be a centralized server or cluster of server computers that maintains the processes and databases for a number of different users, or it may represent a distributed set of computers located in different geographic regions, each serving a different group of users.

The location-based social network manager allows each user to set up virtual networks that connect that user to other people, places, and events in a manner that adaptively utilizes the geographic location information for each of these items. The process 112 utilizes the user profile and preference information to allow the user to define networks of friends within the entire group of users and then locate these friends on maps that are displayed on the mobile device itself. Using the messaging and calendar functions of the mobile device, the user can then send and receive messages on the device from these friends, or find places of interest or events in the area.

In one embodiment, each mobile communication device runs local client versions of the map generator and database manager components. Such a component or components may be a thin-client program, such as a Java program running on a cell phone, for example. In one embodiment, each mobile communication device includes a circuit or component that determines the geographic location of the device relative to a standard set of coordinates. Such a location determination component can be a GPS module or assisted GPS (A-GPS) that provides the location of the mobile communication devices in terms of latitude/longitude coordinates, or a cell phone locator module that provides the location in terms of distance to the nearest fixed cell transmitter location or a group of transmitters, or other similar location determination method. Such methods can include, but are not limited to: Time-of-Arrival (TOA), Time-Difference-of-Arrival (TDOA), a Wireless Fidelity (WiFi) network, mesh networks, and similar networks. The client side map generator displays a map of an area (provided by map database 122) around the user on the display screen of the mobile communication device. Superimposed on this map is an indicator for the location of the mobile communication device. As the user moves, the position of his location on the displayed map is updated in real-time or near real-time. The map image information is configurable depending upon the location of the user, and can be provided by the server computer 104, a separate map provider service, or it can be programmed into the mobile device itself.

In one embodiment, the client-side database manager component stores information relating to acquaintances, friends, family, or other contacts (hereinafter collectively referred to as "friends"), as well as other items of interest, such as places of interest or locations of events of interest. The map generator component can be configured to display the locations of such items of interest or of any friends that are within the region displayed on the map, and have mobile devices that are similarly capable of determining their own location. In this manner, the user of the mobile communication device can see his or her location relative to other friends or places of interest directly on map displayed on the mobile communication device. In general, the displayed map is a street level map to aid the navigation of the user within the region displayed by the map. The map can be scaled from any number of degrees of resolution, such as from country to state or city level down to block level, depending upon the configuration of the map generator component.

Figure 2A:
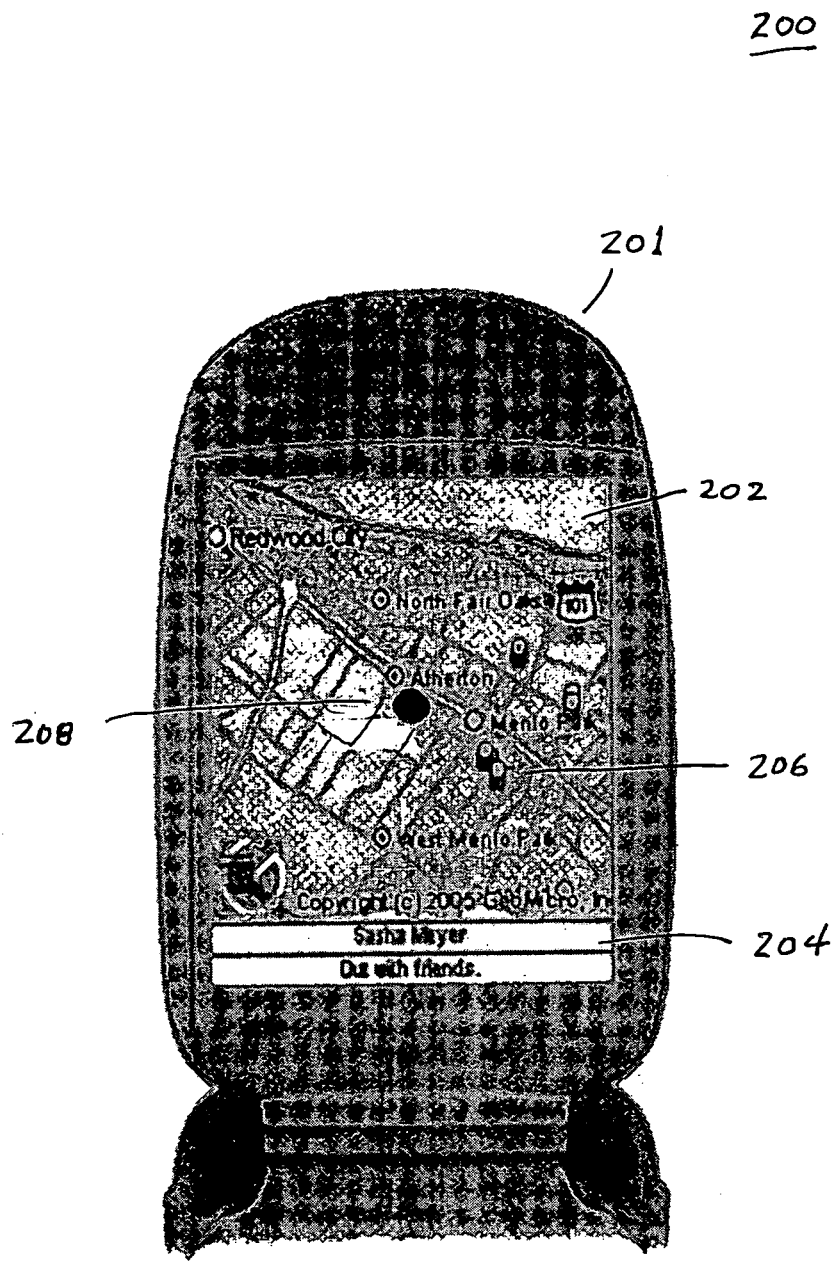
FIG. 2A illustrates an example of a map displayed on a mobile communication device, according to an embodiment.

FIG. 2A illustrates an example of a map displayed on a mobile communication device, according to an embodiment. As shown in FIG. 2A, a mobile communication device, such as cellular phone 200 has a display screen 202. The map generator displays a map on the display with certain icons superimposed thereon denoting the location of certain friends or places of interest to the user. For example, a large circular icon 208 may denote the location of the user of the mobile device, while smaller icons 206 or icons of a different shape and/or color may indicate the location of his or her friends. The display area can be divided into a number of different sub-display areas devoted to displaying information relating to the items displayed. Thus, as shown in FIG. 2A, display area 204 displays certain information relating to the user, such as name, and status information. The status information includes both a status message, a user-programmed message that is displayed on the mobile devices of the other users, and an indication of availability of the user, such as "free" or "busy." A status flag can be defined to allow the user to specify whether he or she is busy or free to all or certain users. Other characteristics can also be defined and made available to other users in the network, such as event preferences, dating preferences, and so on.

Depending upon the constraints of the display of the mobile device, other items of interest, such as names and status of friends and/or places of interest or events can also be displayed or shown on the map. Different visual indicators or tiling techniques, or nested menu techniques can be used to provide access to the graphical information provided on the display. In one embodiment, the process can be configured to display the name, image, and any associated status information for a user when the icon associated with the user is selected on the display.

Figure 2B:
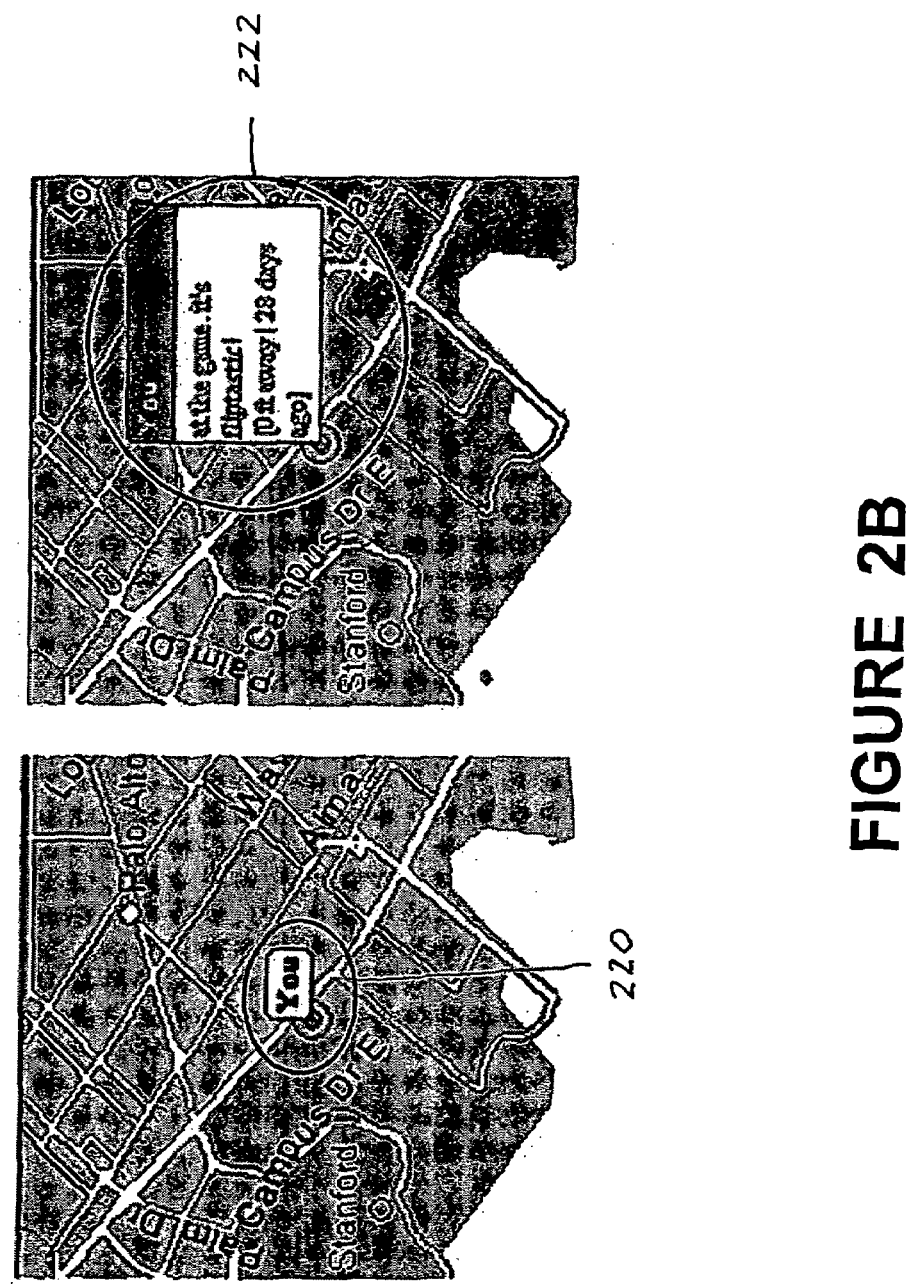
FIG. 2B illustrates the display of information details for users on a map, according to an embodiment.

FIG. 2B illustrates the display of information details for users on a map, according to an embodiment. Because of display space limitations that may be inherent in the mobile communication devices, and even the web pages, various different display configurations can be used to maximize the amount of information displayed at any one time. In one embodiment, pop-up screens are utilized to display the user information for a user whose location is displayed on a map. As shown in FIG. 2B, the default display for a user 220 shows the name or user ID for each displayed user. In this example, the displayed icon is for the user of the mobile communication device himself, and so the user icon is labeled "You." Instead of displaying the user information is a portion of the display screen, the user information is provided in a pop-screen that is activated by a toggle switch or command. Thus, as shown in pop-up display 222, information relating to the displayed user, such as an image, a profile, or a pre-stored message can be displayed without occupying too much display space. This window can be minimized using the appropriate reverse toggle sequence. In this manner, the amount of displayed information can be selected directly by the user.

Figure 3:
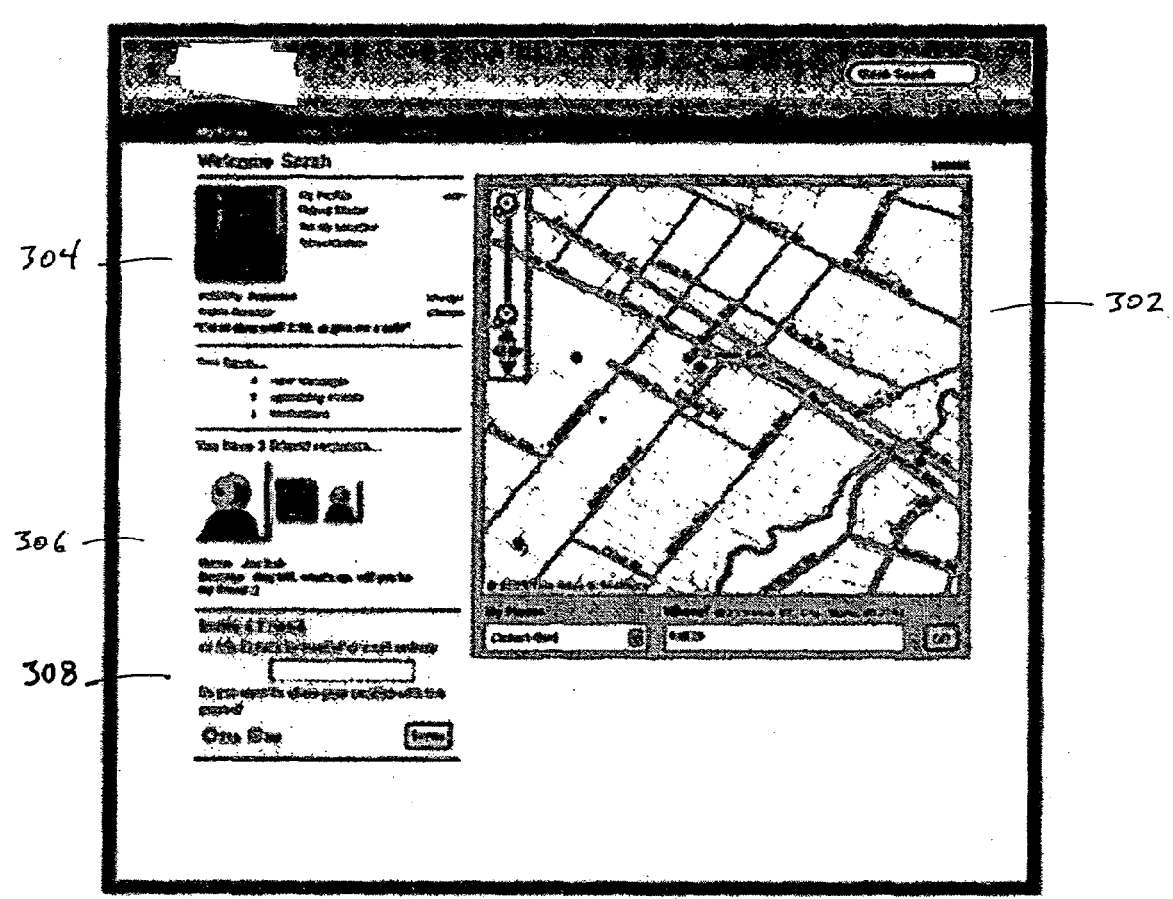
FIG. 3 illustrates a web page that provides access to the databases and social network manager system, under an embodiment.

In one embodiment, access to the account for a mobile device user is also provided through a web-based (or similar) interface from a client computer 106. In general, client accounts and databases are created using the server computer. The client computer provides the means for the user to manage the databases used by the map generator, user database, user provided database, etc. and takes advantage of greater processing power typically not found in mobile devices, such as cell phones. One or more databases are created to store information related to the user's friends and other items of interest, such as events, locations, and the like. In one embodiment, the client computer 106 runs a web browser 114 to access web pages and resources available on server 104 and served by web server 114. FIG. 3 illustrates a web page that provides access to the databases and social network manager system, under an embodiment. For the example web page illustrated in FIG. 3, a first display region displays a map 302 showing the location of the user's mobile device. The user's profile is displayed in display area 304. Other display areas can be configured to display other items of information depending upon the requirements of the user. For example, display area 306 can display messages or requests from friends, and display area 308 can provide an input area to send messages or requests to friends. The information shown on the web page 300 can be the same information displayed on the mobile device in a scaled up and rearranged format to take advantage of greater display space, or it may display information that is impractical to show and manage on the mobile device.

Figure 4A:
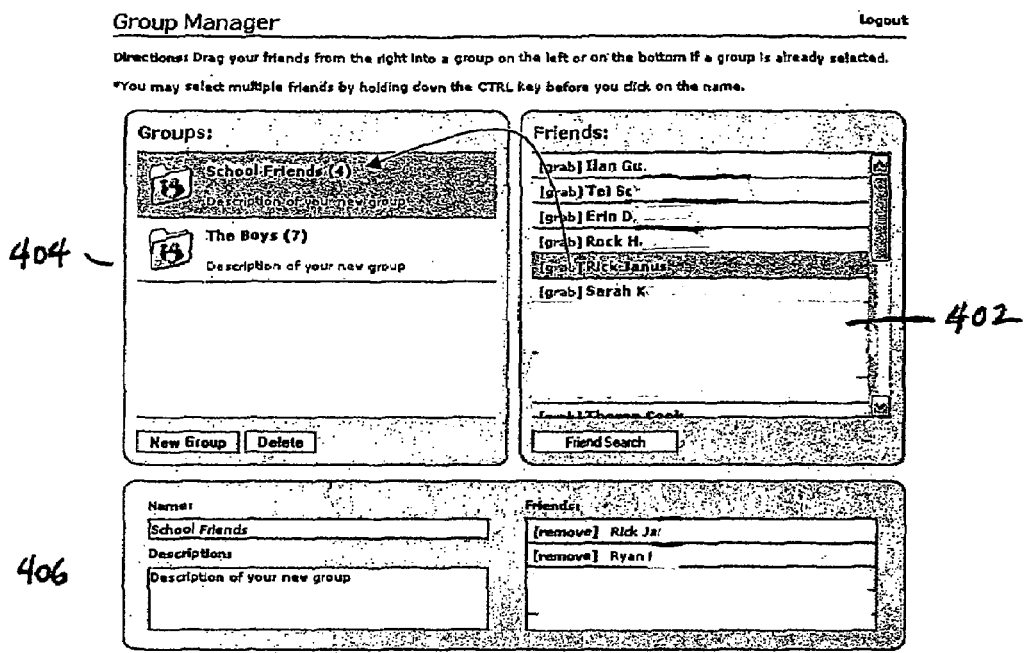
FIG. 4A illustrates an example of a database interface for storing and grouping friends on a client computer, under an embodiment.
Figure 4B:
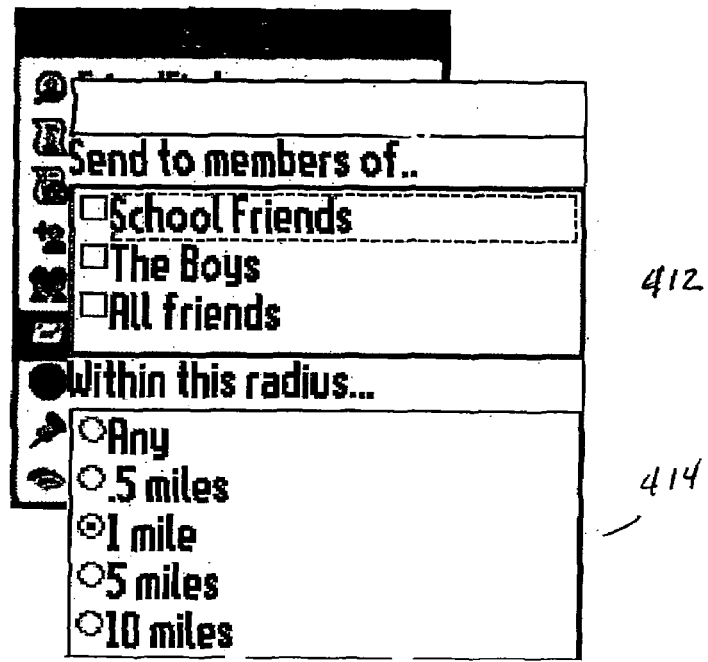
FIG. 4B illustrates an example of a database interface for storing and grouping friends for implementation on a mobile communication device, under an embodiment.

The database manager allows a user to create a database of friends, family, acquaintances, events, places of interest, favorite things, and any other items that have geographic and/or time context with respect to interests of the user. These data objects are stored in the user database 124 for each user. The information in this database can be organized in any number of ways. For friends, a grouping function allows the user to define specific sub-groups of friends to facilitate finding or messaging select people out of the total number of friends. Thus, friends and acquaintances can be grouped into different categories to allow easier identification and contact with specific people. The client side module on the mobile device allows the user to access and modify these databases of people, events, and so on, on the mobile device. FIG. 4A illustrates an example of a database interface for storing and grouping friends on a web page, and FIG. 4B illustrates an example of a database interface for accessing the friends database on the mobile communication device. In one embodiment, the mobile communication device interface can also allow the user to manage the database by allowing storage and grouping of friends through a function similar to that illustrated in FIG. 4A. As shown in FIG. 4A, a list of contact names from the user database 124 is displayed in display area 402 and a set of groups is displayed in display area 404. Through a drag and drop operation, or similar method, names can be added to one or more appropriate groups. Display area 406 allows a user to define or modify an existing group by naming, describing and modifying the composition of the group. A similar database access and grouping function is provided through the client side program for execution on the mobile communication device. The client side module allows the user to access the group database on the client computer, and add or modify the group definitions. As shown in FIG. 4B, the defined groups are shown in display area 412. In addition, a geographic descriptor is also provided to further define a characteristic associated with the group or any member within a group. For the embodiment illustrated in FIG. 4B, display area 414 includes a descriptor that specifies the radius of the group members relative to the user's mobile communication device. In this manner, a message or alert can be sent not only to members of a particular group, but members who are within a certain proximity to the user. This additional degree of communication filtering takes advantage of the geographic location information determined by the network 100. This location element related to the database of friends and groups can also be employed by the client computer 106 when it accesses the database on server 104.

Figure 5A:
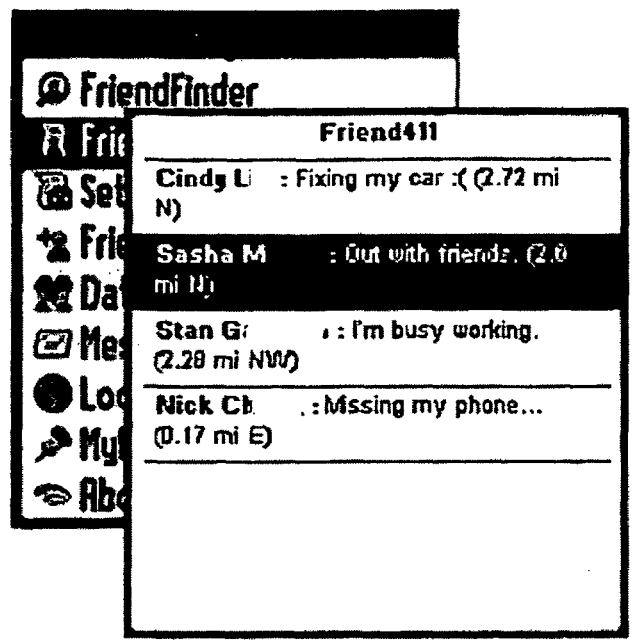
FIG. 5A illustrates an example of a friend list displayed on a mobile communication device, according to an embodiment.
Figure 5B:
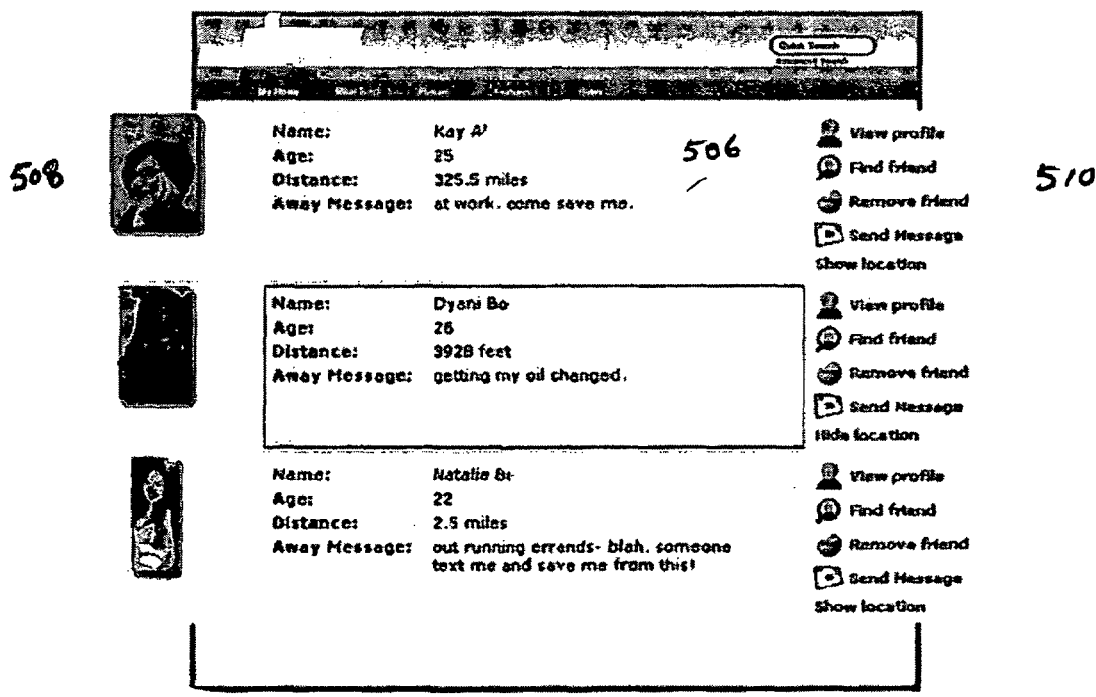
FIG. 5B illustrates an example of a friend list displayed on a web page, according to an embodiment.

Information within the databases stored in data store 120 can be combined in any number of ways to provide the user with appropriate data relating to his or her friends. The location information relating to each friend can be used to provide a visual reference for the user on a map of the area, such as that illustrated in FIG. 2A. In one embodiment, the location-based social network manager process includes a list utility that allows the user to pull and display various items of information relating to each of the friends within the system. Not only can location information be displayed on a map, but specific information can be displayed in a list format on the client computer or mobile device of the user. FIG. 5A illustrates an example of a friend list displayed on a mobile communication device, and FIG. 5B illustrates an example of a friend list displayed on a client computer, according to embodiments. As shown in FIG. 5A, the friend list function starts a display window 502 on the display of the mobile device that lists friends whose information is accessible to the user. For each listed friend, various items of associated information can be displayed, such as the name, location (address, distance plus direction vector, latitude/longitude, time of last update or other), and any associated message or status information. The status information is programmed into the profile portion of the user database 124 for each friend and is pulled from that database, while the location information is pulled from the location database 126 for each friend and is pulled from that database. If the display of the mobile device accommodates the inclusion of the user's image, that can be pulled from the images within the user provided database 128 and also displayed on the mobile device. This is illustrated in the interface for the client computer shown in FIG. 5B. In this embodiment, the same location and status information 506 is displayed for each friend along with an image 508 of that person. Also provided in the illustrated client computer interface is a menu area 510 that allows the user to perform certain tasks associated with the friends list, such as finding or removing friends, or sending messages to other users.

Because the location-based social network manager stores and provides access to sometimes sensitive personal information of a user to a network of people, certain security and privacy measures are included to allow the user to control who has access to this information. This can include the user's location information as well as profile and network interaction information. Some of the security functions include the ability to turn off the location sharing so that the location of the device is not broadcast and cannot be determined by other mobile device users. The location sharing on/off feature can be triggered through the website, a mobile application, a customer service call, or via an SMS message, or the like. If the mobile communication device is lost or otherwise compromised, the user can disable access to the service by expiring the session id and wipe all information from the device by means of an appropriate message or signal to the device.

Through a privacy preference utility, the user can define which characteristics the user can share with others within his or her social network, and set filters to limit access of certain information to only certain users. For example, the user can specify which user or group of users within the network can see the location of the user by defining a "blacklist" of users who are not allowed to see the location information.

Figure 6A:
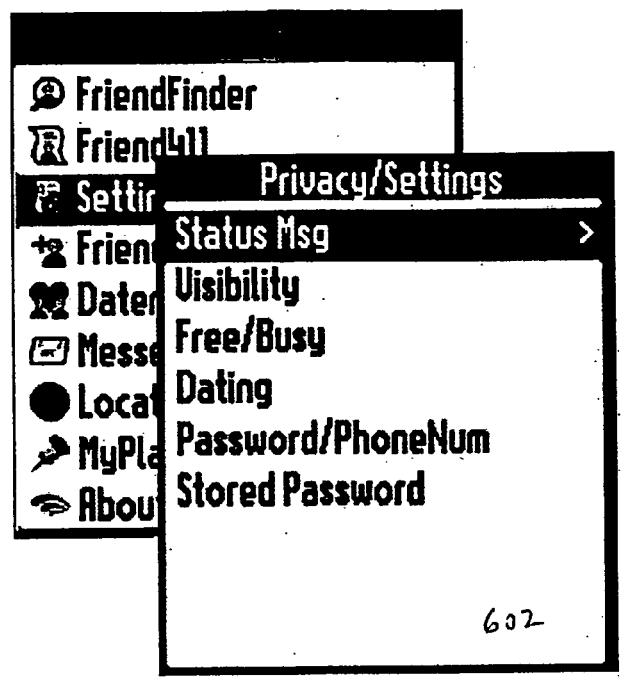
FIG. 6A illustrates an example of a privacy preference menu displayed on a mobile communication device, under an embodiment.
Figure 6B:
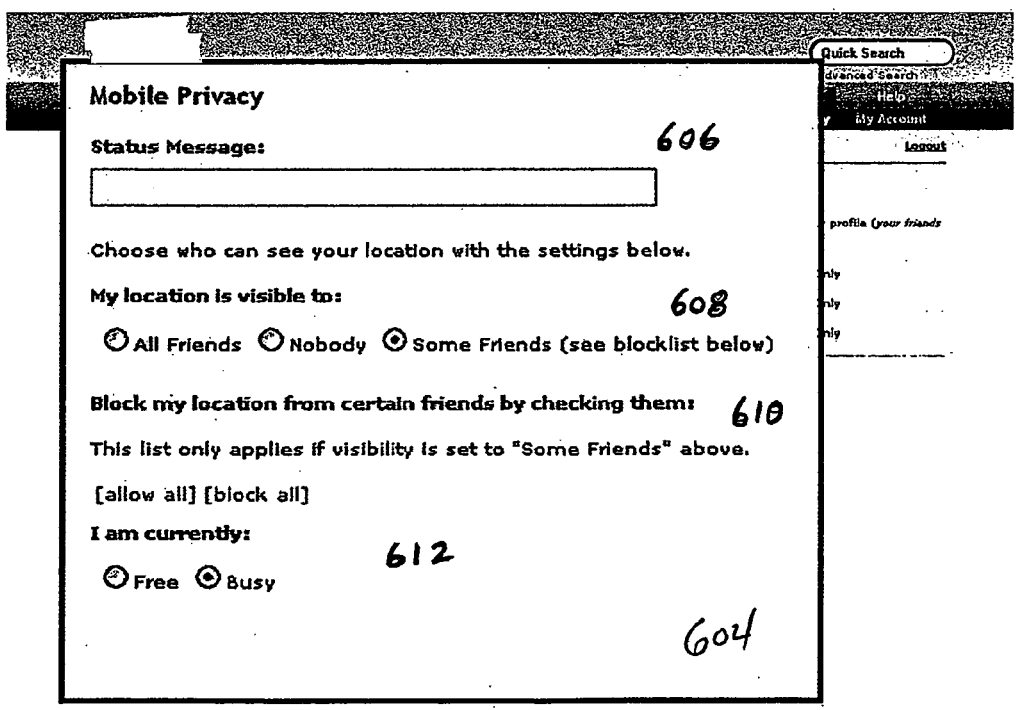
FIG. 6B illustrates an example of a privacy preference menu displayed on a web page, under an embodiment.

FIG. 6A illustrates an example of a privacy preference menu displayed on a mobile communication device, and FIG. 6B illustrates an example of a privacy preference menu displayed on a client computer, according to embodiments. As shown in FIG. 6B, the privacy and settings window 604 provides fields or commands that allow the user to specify a status message. This is the message that is displayed on the mobile devices of the other users, such as shown in FIG. 5A, and the web pages of other users. A short message can be typed in depending upon the constraints of the system and can provide a small amount of useful information. The visibility setting 608 allows the user to set which friends are allowed to view the user's location information, and can be applied to all or no friends, or specific friends specified on the blocklist. Display area 610 allows the user to list the friends in the blocklist. Display area 612 illustrates a simple free/busy toggle that allows the user to set his or her status as free or busy. The busy setting may be configured to block the user's information from his or her friends until the user becomes free. The interface 604 illustrated in FIG. 6A allows the user to set the privacy for the user's mobile device. Depending upon the constraints of the mobile device, the same or a subset of the privacy settings can also be displayed and accessed on the mobile device itself. The corresponding fields for the mobile device are illustrated in display window 602 of FIG. 6A. Additional fields may also be provided, such as a dating profile or preference, and a password specifier.

The mobile communication device can also be configured to provide other functions or utilities that facilitate user interaction with friends based on the location information displayed on the mobile communication device. For example, a messaging utility can be used to send and receive text or voice messages from a friend or groups of friends within a displayed area. In one embodiment, the location-based social network manager process 112 includes a messaging module that allows messages to be sent to friends on the device where they are most likely to see it. The messaging module utilizes the group module and the geographic location functionality of the mobile communication device. The message can be sent as a text message or instant message (IM) between mobile communication devices, or as a web message between client computers. In general, messages can be transmitted between any of the computers and devices illustrated in FIG. 1, thus, messages can go from mobile to mobile, web to web or mobile to web.

Figure 7A:
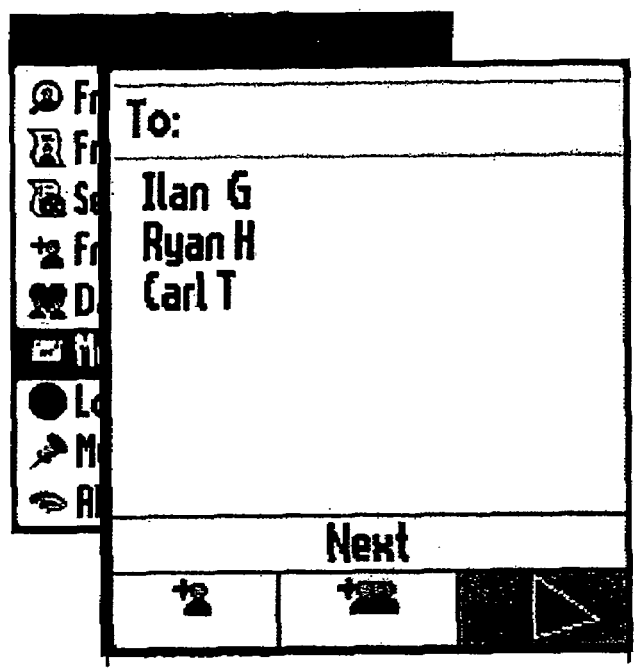
FIG. 7A illustrates an example of a messaging function for implementation on a mobile communication device, according to an embodiment.
Figure 7B:
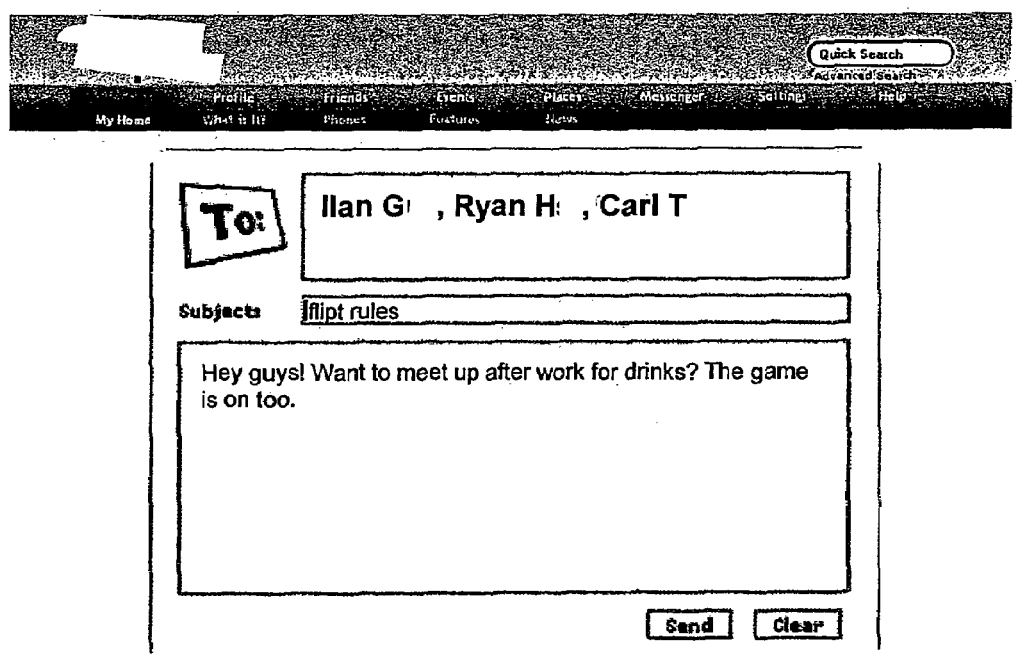
FIG. 7B illustrates an example of a messaging function for implementation on a web page, according to an embodiment.

FIG. 7A illustrates an example of a messaging function for implementation on a mobile device, and FIG. 7B illustrates an example of a messaging function for implementation on a client computer, according to embodiments. As shown in FIG. 7B, the client computer based messaging function can be provided as a simple user interface with fields for the recipients, message subject, and message. An attachment utility can also be included to allow the transmission of attached data objects, such as documents, files, pictures, and the like. The mobile communication device version of the messaging function is typically a simple text based utility that displays the recipients and the text message to be sent, and if space is constrained, these display areas may be provided in successive screens of the device, as shown in FIG. 7A. Message data can be sent via standard SMS protocol, data transfer, or any other suitable messaging protocol.

In one embodiment, the social network manager also includes an event manager module that allows a user to program places and/or events of interest. The event manager allows the user to create and manage various events using date and location information and send invitations or messages regarding the events to friends using the grouping function and messaging utilities of the system. Thus, the event manager module utilizes the group module and the geographic location functionality of the mobile communication device. Lists of public events can be provided by separate event servers accessible to the server, client computers or mobile devices of the system 100, or they may be programmed into an event database stored in data store 120. Typically private events are created and stored by each user, and each user may store events or other similar information in their own user provided database. Alternatively, events can be stored in one or more separate event databases (public and/or private events) within database store 120. If permission is granted, the database functionality of the mobile devices allows a user to view events created by other users or those that are public. Public events are typically events that are provided by users or partners that provide event information.

Figure 8A:
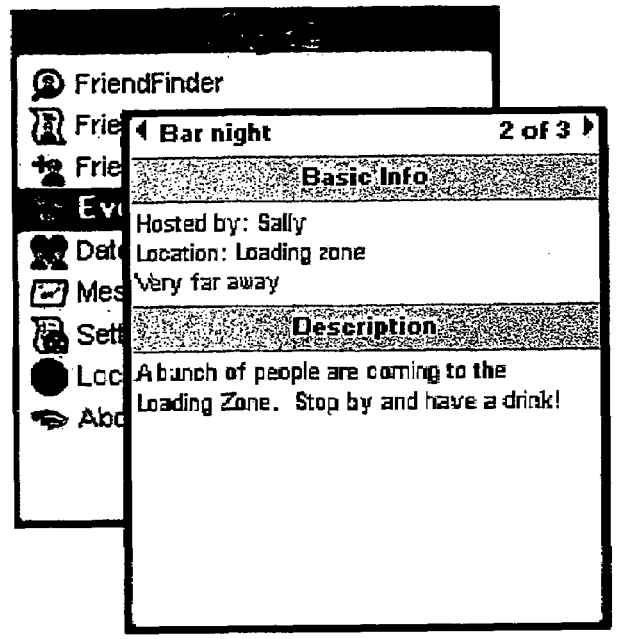
FIG. 8A illustrates an example of an event manager function for implementation on a mobile communication device, according to an embodiment.
Figure 8B:
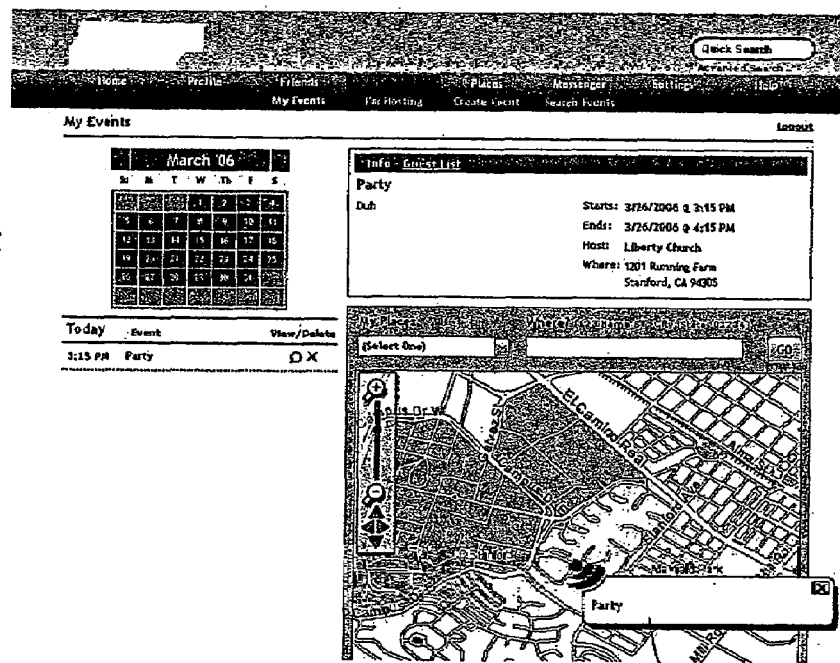
FIG. 8B illustrates an example of an event manager function for implementation on a client computer, according to an embodiment.

FIG. 8A illustrates an example of an event manager function for implementation on a mobile device, and FIG. 8B illustrates an example of an event manager function for implementation on a client computer, according to embodiments. As shown in FIG. 8B, a display area 810 displays a description of the event including the time and place of the event, as well as any other relevant information. The location of the event is shown as an icon 813 on a map displayed in display area 812, and the date of the event can be shown on a calendar displayed in display area 814. Similar information can be provided through the client side program for display through the mobile communication device, as shown in FIG. 8A. Depending upon the constraints of the display the event information can be provided in a series of screens. Additionally, certain geographic parameters can also be provided, such as relative distance to the event based on the location of the mobile communication device as well as the location of the event on the map.

In one embodiment, the location-based social network manager includes a point of interest (POI) feature that allows users in the network to program and share private and public points of interest with one another. A database specifying places and/or events can be stored in data store 120. This database can store different items of information relevant to a place of interest, such as, location, hours, products/services provided, and so on. This information can be provided to a user in a "pull" model, in which the user searches for the stored places of interest through the web page or mobile communication device. Alternatively, the information can be provided to the user in a "push" model in which the server sends relevant POI information to a user based on a user condition, such as if the user goes near a particular POI. The POI feature utilizes a reverse geocoding method in which the system determines the user's location, and correlates the location coordinates to entries in the POI database to determine which bar, restaurant, or other where they may be. This POI information can then be displayed on the user's friends mobile communication devices as the location of the user. This allows the system to automatically determine and display the location of a user and to share more descriptive and precise location information without requiring the user to manually type anything. For example, using the friend finding and messaging functions, a user can send a message to his or her friends simply saying that they are near the "ABC" bookstore instead of any address or other location information. In determining the location of the user, the server looks up the latitude/longitude information of the user, matches it to the corresponding POI, and sends the POI information to the other users in the network.

The storage of POI information in a database allows a user to search for and find places of interest almost automatically using the location finding capabilities of the mobile communication device. The user can specify a POI to be found, and the system will display the location of the POI relative to the user. The user can then bring up the relevant information relating to the POI, such as hours, prices, and so on. Places of interest can be private or public. Public places of interest are those that are defined or provided by the server or third party providers. Private places of interest are those that are defined by individual users. Depending upon the privilege settings, a user may be able to access his or her friends places of interest.

In one embodiment, the POI feature provides a tagging and feedback sharing mechanism that allows the user to tag a place and provide feedback. Tagging involves noting the location of a place or capturing an image of the place and downloading it to the server. User feedback can be provided as text messages or rankings using a user-defined or pre-defined template that is stored in the user-provided database or separate POI database. This database can be made available to friends or other users of the network, depending upon the preferences set by the user. Various messages, such as reviews, advertisements, and the like can be associated with each POI and displayed upon selection of the POI by the user. The POI and messaging features also enable users to send itineraries of trips to groups of friends. This greatly facilitates the planning and communication of group trips.

In one embodiment, the location-based social network manager includes a review and recommendation function that allows each user to review and rank events or places of interest so that this information can be shared with the other users. When a user visits a tagged POI (or attends a tagged event), he or she can provide a numerical (keypad) ranking of 1-9 and/or write a short summary of the place. The server process can also be configured to automatically request or remind the user to provide a ranking or summary of the POI upon the user's next system login through the web site or the mobile communication device. For each POI, the server compiles the rankings and summary reports and makes these available to any user who desires to see them. The server process can also be configured to compile statistical profiles or qualitative profiles of different tagged places of interest once enough ranking or summary information is available.

The server process can also include a machine learning component that can provide personalized ranking and reviews for individual users based on the identity of the reviewers. This process includes a Bayesian trust network component that learns each user's trust levels with respect to the other user's. Each user may trust certain of their friends with respect to certain types of places of interest. In this case, the system will weight the ranking provided to the user based on the identity of the reviewer if the reviewer opinion is particularly trusted with respect to the tagged POI. In this manner, personalized and dynamic ranking and review profiles can be established for each POI based on the users and reviewers.

In one embodiment, an auto messaging mechanism sends an alert to a user based on the POI of another user. For this embodiment, when the user tags a particular POI, the server sends an alert to that user when a friend of the user gets within a certain distance of the POI. In this manner, the user can call, send a message, or arrange to meet with his or her friend at the POI, without needing to go through the trouble of pre-arranging a meeting. This facilitates spontaneous networking among users and their friends at particular places of interest. It should be noted that places of interest can be any type of location, such as retail establishment (store, restaurant, club, theater, gas station etc.), building (office, house, etc.), public resource (library, museum), street corner, object (e.g., ATM kiosk, post box), and the like.

Figure 9:
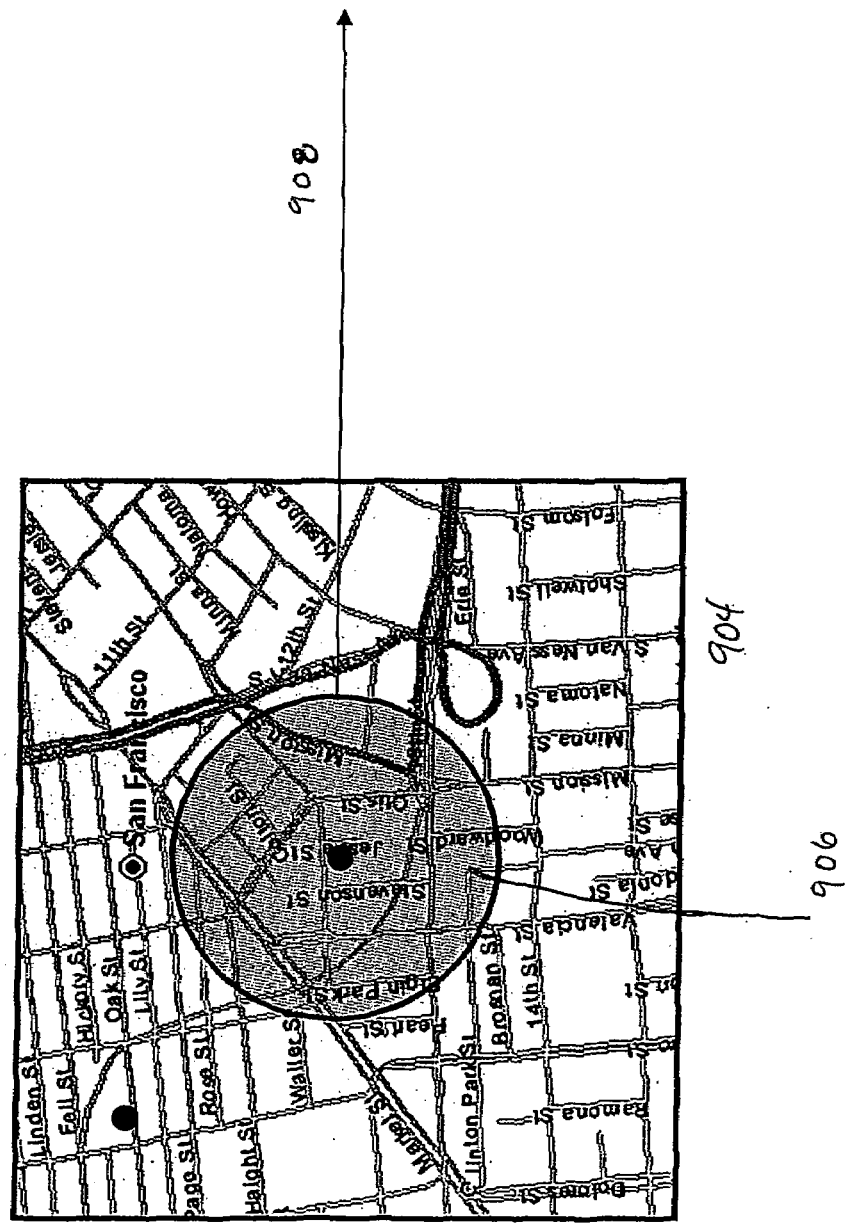
FIG. 9 illustrates an example of an alert function for the location-based social network manager process, under an embodiment.
Figure 9:
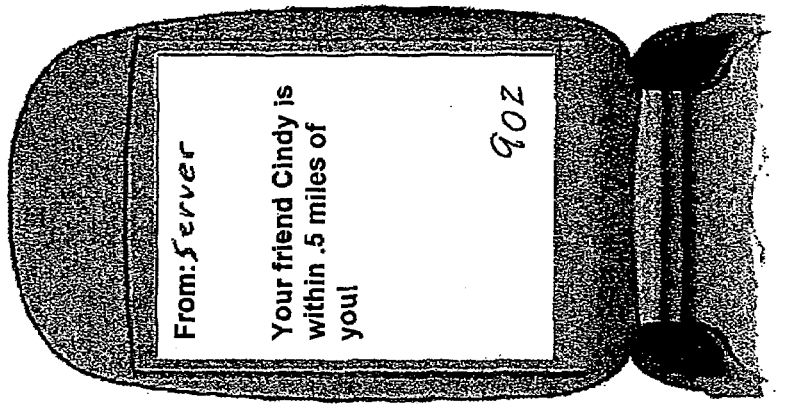

Several interactive network features are facilitated through the use of the location determination and message capabilities of the mobile devices. For example, not only can friend locations be displayed on a user's mobile device, but an alert function can provide a graphic or audible alert to the user when a particular friend has entered a user determined area or region around the user. FIG. 9 illustrates an example of an alert function for the location-based social network manager process, under an embodiment. The user can specify a radius 906 around which he or she should be notified if a friend enters. The server computer then performs a periodic comparison of the user's location compared to that of his or her friends to determine if any of the user's friends are within this specified radius. The user location and radius are displayed on map 904. When a friend enters this radius, as determined by the server computer, a message is sent from the server to the user over network link 908 and displayed on the user's mobile device 902. The alert function can also be used to facilitate other interactive features, such as displaying or alerting the user to the location of places of interest in the displayed area or the time and location of events of interest when the user enters a particular area.

The user interface screens illustrated in FIGS. 2A through 9 can be configured in any number of ways depending upon the constraints, requirements, and preferences of the system and system integrators. Various types of icons can be used to specify the identity and status of users and friends on the mobile devices and client computers of each user. For example, a portion of the mobile device display, such as the top of the menu may include one or more icons indicating whether the location of the device has been determined and whether or not the user is sharing his or her location information. The icons can be color or shape coded to define all of the different states available with regard to the user's location and status information. Likewise, the map display and icons for friends, places, events, and so on can be customized depending upon the needs and preferences of the user. Scrolling and scaling functions for control of the displays on both the mobile device and client computers can also be customized to utilize the input/output interfaces available on the different devices that can be used in conjunction with embodiments of the location-based social network manager process.

Location Determination

In one embodiment, each mobile communication device 102 includes a device location module that allows the mobile communication device to determine its own geographic location so that the location of the user operating the device can be displayed on a map on the device, as well as on the mobile devices and client computers of other users in the network. In one embodiment, the location information for mobile communication device is transmitted and stored in the server computer of the network. The location information for all of the users is then transmitted from the server to the mobile communication devices based on the filters and preferences established for each of the users.

For an embodiment in which the network 110 is a cellular phone network, and the mobile communication devices are cellular phones or cell based communication devices, the device location module is a cell ID positioning program that determines the location of the device relative to the nearest one or more cell transmitters to determine a location fix of the device. Depending upon the capabilities of the system, location accuracy can be provided on the order of one to two hundred meters to actual location. If accuracy is not sufficient, the user can be provided with their approximate location either through map or text display and then input their actual location using street address, point of interest, or latitude longitude information.

In one embodiment, the location determination module is a GPS (global positioning system) circuit that determines the location of the mobile communication device using GPS methodology. GPS circuits are capable of updating a device's location on a real or near real-time basis. However, such continuous updates can impose a great deal of processing and communications overhead on the device and the network. Moreover, for a device that is capable of displaying the location of any number of other users, such continuous update methods are highly impractical. If the actual location of every friend in a network were required to be determined every time the user brought up a map, the time and cost requirements would likely be excessive. For embodiments in which the communication network comprises a cellular phone network and the mobile devices are cell phones, the location determination module may be an assisted GPS or "A-GPS" module that uses an assistance server and cell tower that helps the GPS receiver in the phone perform tasks of range measurements and position solutions.

In general, the task of determining location in a mobile device and transmitting location information to a server can utilize a significant amount of power and processing resources, as well as generate a great deal of network traffic to the server. For systems with a large number of mobile devices, polling each device at a set frequency (e.g., every three minutes) could result in an overwhelming amount of network traffic. To minimize the power usage and network and processing overhead, an embodiment of the location determination module employs a GPS polling method that polls the device location of each mobile device in the system as infrequently as possible to thereby impose a minimum load on the carrier networks. The GPS polling method is an iterative polling method that employs a caching mechanism that updates a user's location based on known location information and user behavior. Instead of polling each mobile device in the network at a fixed frequency, the frequency of the location polls for each device depends on the movement and/or activity (interaction with the server) of the user. If the user is stationary and inactive the polling frequency is minimized to result in fewer GPS location polls. If a user is on the move and/or interacting with the server computer, the polling frequency is increased to result in more frequent GPS location polls. A difference value can be used to determine whether the updated location information is stored in the cache and/or transmitted to the server computer, thus adaptively utilizing system resources depending upon the amount of movement or activity of the user.

Figure 10:
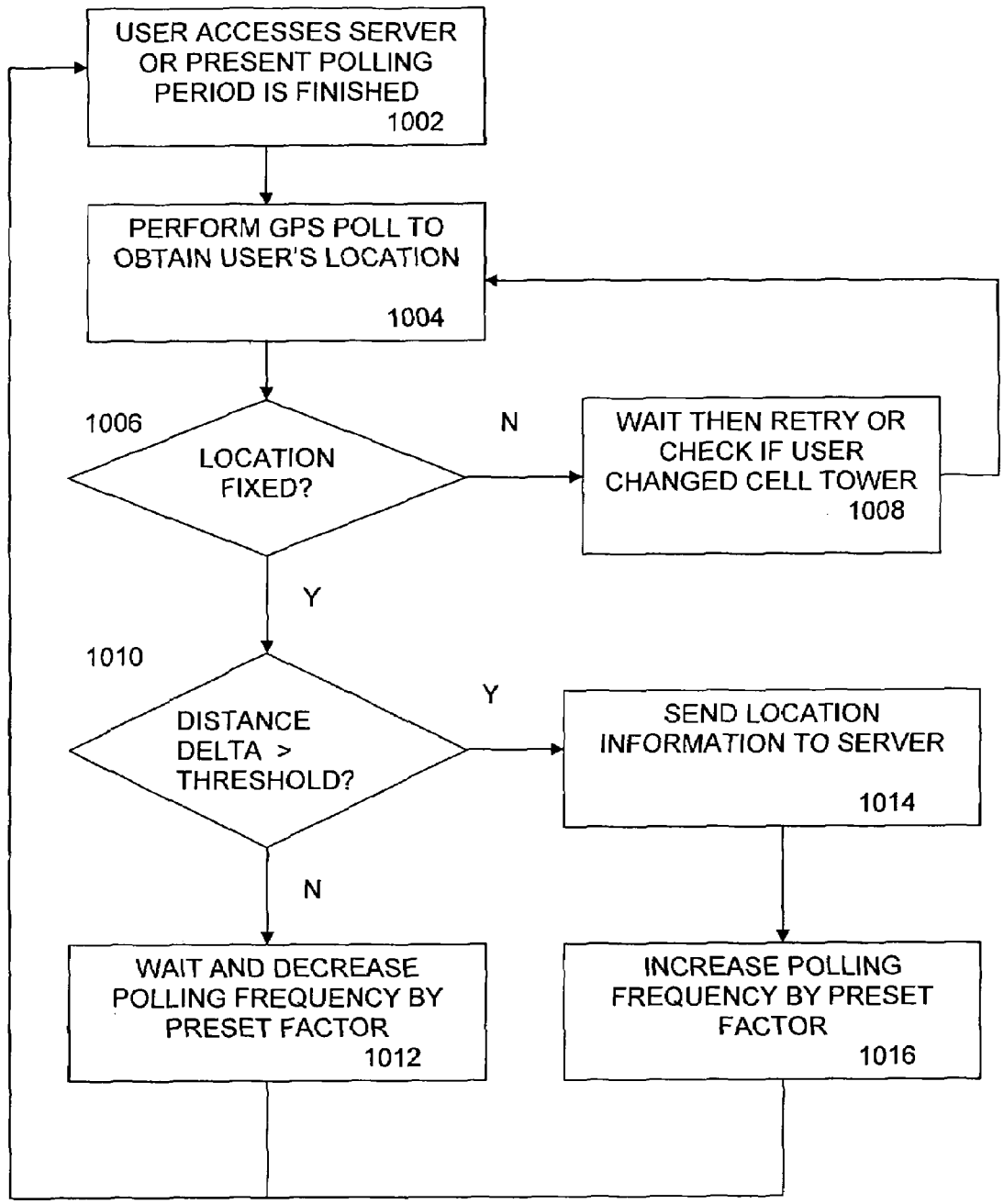
FIG. 10 is a flowchart that illustrates GPS polling for a location determination module, according to an embodiment.

FIG. 10 is a flowchart that illustrates GPS polling for a location determination module, according to an embodiment. A location poll operation can be performed each time a user forces a location update from his mobile device, accesses the server computer from the mobile device, or at the end of a present polling period, 1002. In the event of any of these occurrences, the user's present geographic location is determined, 1004. In certain cases, a location fix might not be obtained, such as due to lack of signal, loss of device power, and so on. In step 1006 it is determined whether or not a location fix was obtained. If not, the device will wait (enter sleep mode) for a preset period of time, such as two minutes, and then retry the location fix. If a location fix is not obtained after a number (e.g., five) of tries, the system will determine whether or not the user has changed cell tower location, 1008. If so, the system will send the cell tower location to the device and the location fix will be attempted again, otherwise, the device will longer period sleep mode before retrying.

If a location fix is obtained, a smart polling process is executed wherein the change in distance (distance delta) of the user from the present location and the previous location is used to set the polling frequency, and the location information is updated to the server computer. In step 1010 it is determined whether the new fixed location differs from the previous location by a threshold distance. If the distance delta is not greater than the threshold value, it is assumed that the user has not moved by an appreciable amount, and therefore no location update to the server computer is necessary In this case, the location polling interval is increased by decreasing the GPS polling frequency by a preset factor. This results in fewer GPS location pulls for a relatively static user. The process then continues from step 1002 at the end of the first new polling period. If, in step 1010, it is determined that the distance delta is greater than the threshold value, then it is assumed that the user has moved by an appreciable amount. In this case, the location information is transmitted to the server, 1014. The polling frequency is also increased by a preset factor depending upon the current polling frequency. If the present polling frequency is slow, it can be increased to track the user. The process then continues from step 1002 to obtain a new fix at the end of the shorter period. If the user slows down or stops, the distance delta comparison step 1010 will cause the polling frequency to decrease in accordance with the reduced movement of the user.

The initial and modified location polling frequencies can be set to any value in accordance with the requirements and constraints of the server and mobile devices. For example, an initial polling interval could be set to 20 minutes, and the wait or sleep period could be set to anywhere between 15 seconds to 300 minutes. Likewise, the threshold distance represents the minimum distance that the user has traveled to require that the system update his or her location, and can vary from a few meters to a few kilometers, or more. The increase or decrease in the polling interval performed in steps 1012 and 1016 can vary from 100% of the present polling period up to a certain maximum number of minutes, such as between 80 minutes to 300 minutes, depending on certain factors such as time of day, system requirements, and so on.

The GPS polling method illustrated in FIG. 10 provides for efficient use of network and mobile device resources based on each user's activity and movement. The more active or more mobile a user is, the more frequent the GPS location determination operations occur. Likewise, if a user is stationary or less active, the GPS polling frequency is reduced. This results in less use of GPS services and network usage. Such polling can also be tailored depending on a user's sleep or general travel or commute patterns.

In one embodiment, the latest location information for a user is stored as a data entry on the mobile communication device and sent to the server for temporary or permanent storage. Each location entry is stored, at least temporarily, in the location database 126 on the server computer. The server computer can be configured to store only the latest location for the user, or all previous locations of the user in a location log. The location log entries include a time stamp based on the location poll time and the latitude/longitude (or other location indicator) at that time. To reduce memory usage successive unchanged location entries can be discarded so that only changes in location are stored in the location log. Security or privacy functions can be implemented to block the access of location history information to anyone but the user himself.

Data Synchronization and Privacy

In one embodiment, the location-based social network manager process 112 includes an intelligent caching and synchronization function that caches critical data with normal updates to each mobile communication device in the network. Because a user can update their own data on either the mobile communication device or through the client computer, and other members can also impact a particular user's data, a synchronization function is necessary to ensure that the information available to the user is as up-to-date as possible while minimizing network traffic. Data between the user's mobile communication device and account data stored on the server and/or client may be out of sync because the user changed the data on the web site, but not the mobile device, a friendship request from another user was confirmed, or some other input from another user was input to the system. Each class of information to be synchronized is assigned a version number, which is maintained by both the server computer 104 and the respective mobile communication device 102. Each time a mobile communication device makes a request to the server, its data packets are prepended with a set of synchronization bytes. The server checks all of these bytes. If the data is out of sync with data that is on the server, the updated information is prepended by the server computer for transmission back to the mobile communication device.

Figure 11:
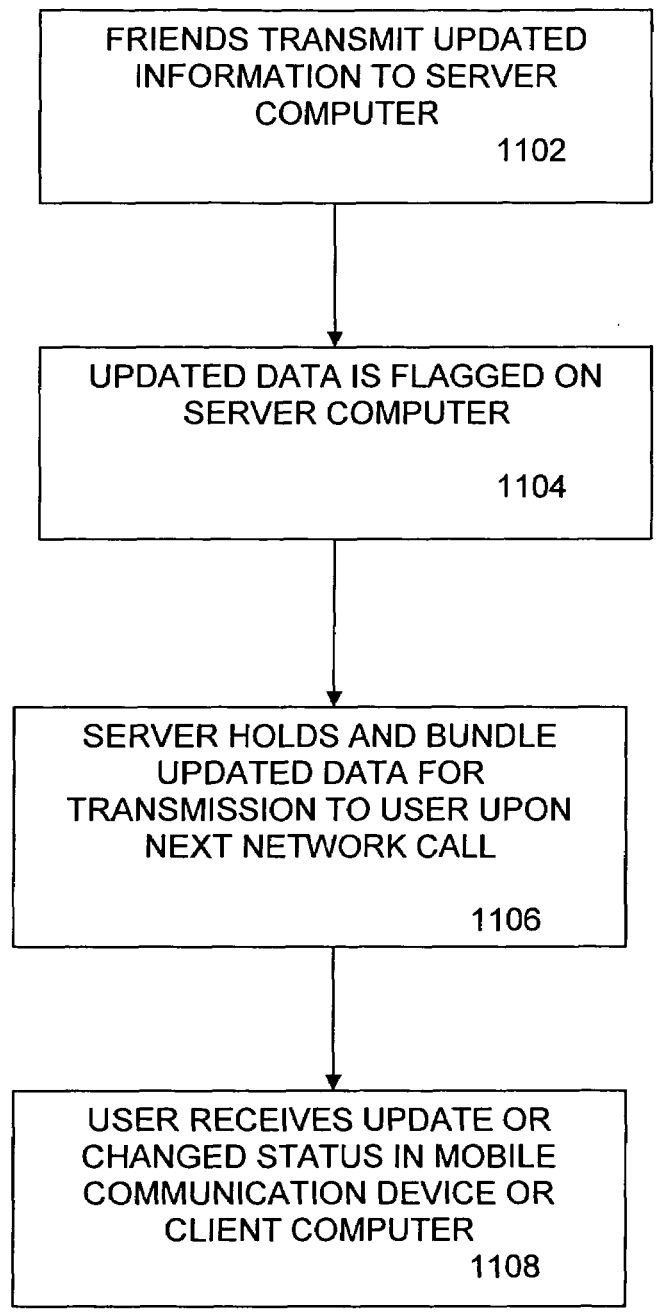
FIG. 11 is a flowchart that illustrates an example of sending updated information to a user's mobile device, under an embodiment.

Certain important data is cached on the mobile communication device itself. This includes the status of a user's friends on the network and other similar data that is small in size and frequently accessed. The caching mechanism reduces the network traffic between the mobile communication device and the server computer, thereby increasing network efficiency, minimizing open sockets on the network, and providing a more fluid and immediate user experience through the mobile communication device. The synchronization function is used in conjunction with the mobile communication device cache to ensure data coherence between the user's mobile communication device and the server computer. FIG. 11 is a flowchart that illustrates an example of sending updated information to a user's mobile device, under an embodiment. In step 1102, any friends with updated information transmit the new data to the server computer. The updated information can be generated by a new location fix or through a message transmitted over the system or a parameter change in the user's database. For example, an information update can be performed by the user inputting certain new or modified information directly into his or her mobile device, or automatically through a friend update, such as a status change caused by a friend changing location, sending a message, or changing the status availability flag. The updated information is transmitted from the mobile communication device to the server computer. On the server computer, the data is updated and flagged as updated data, step 1104.

Although the server computer can be configured to transmit the updated information along to the user as soon as it is received, in a preferred embodiment, the updated information is sent only upon user activity to reduce network traffic and tailor data updates based on user demand. If a user is not active, it is assumed that the user does not necessarily need real time updates of changed friend information. Any user activity with the server computer can trigger an update, such as powering on the device, making a request for services, forcing a location fix, or a performing a refresh operation, and the like. Upon receiving a network call from the user, the server computer bundles all of the flagged and held updated data and transmits it to the user. Thus, in step 1108, the user receives the updated data or changed status for his or her friend on the mobile device or client computer.

Figure 12:
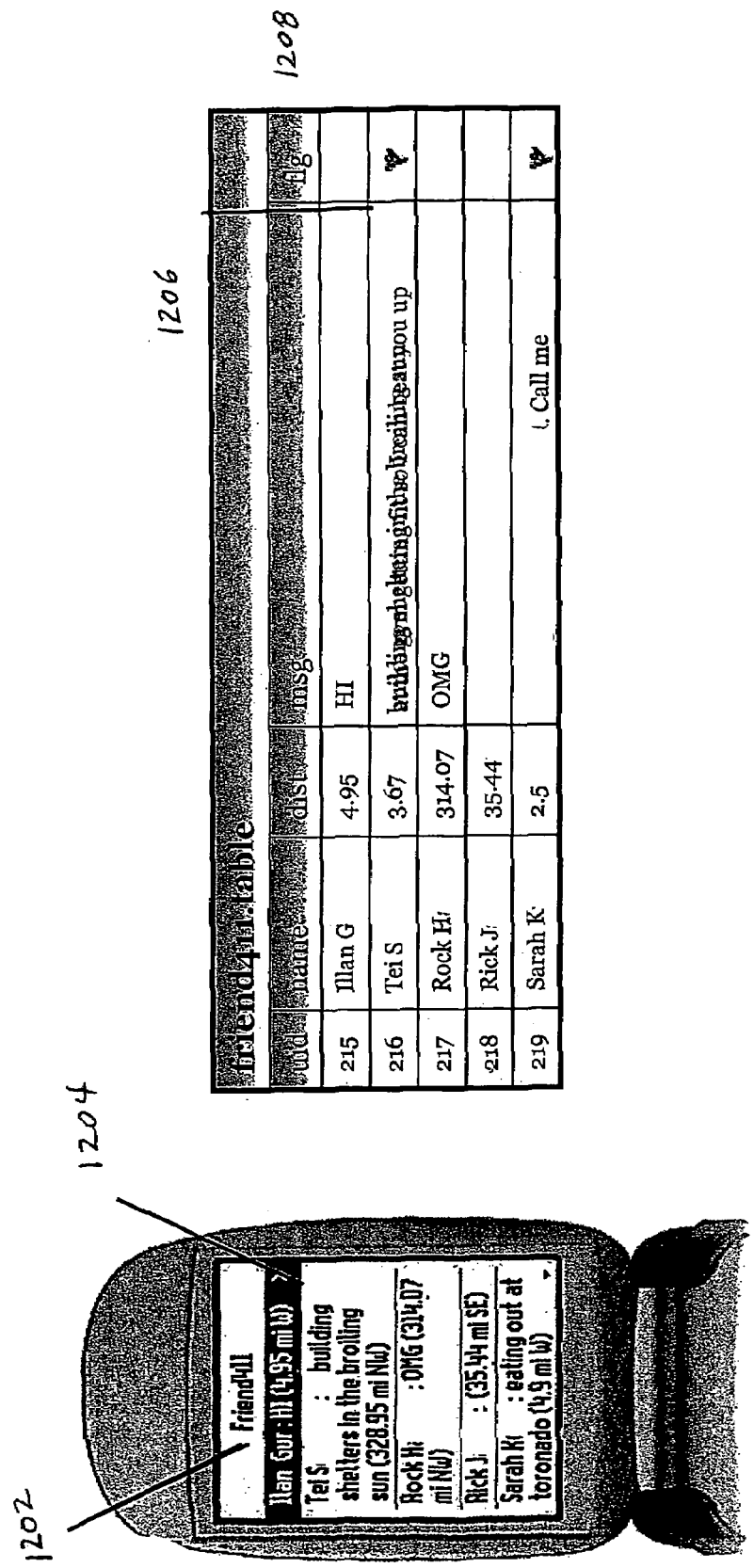
FIG. 12 illustrates an example of a user update on a mobile communication device and a corresponding update table, under an embodiment.

FIG. 12 illustrates an example of a user update on a mobile communication device and a corresponding update table, under an embodiment. The display area 1204 of mobile communication device 1202 displays the status information for a number of friends. This information is cached on the mobile device itself. The status information may be updated as a friend changes location or sends a message or signal that indicates a change in his or her status with respect to the user of the mobile communication device. The status information is stored in a corresponding friend information table 1206, which is stored on the data store 120 of the server computer 104. As shown in FIG. 12, the information table 1206 stores the user ID, and name of the user's friends, as well as their distance to the user and any message text that was sent to the user from each friend. The table 1206 also includes a flag column 1208 to indicate the friends which have updated status information transmitted from the user's mobile communication device. For the example shown in FIG. 12, message information for users 216 and 219 have been updated as indicated by the flag icon in column 1208, as well as the graphical overwriting of the message in their respective message columns. This flagged data will be sent to the user upon his next interaction with the server computer.

To ensure protection of sensitive user information, such as profile data, credit and/or bank account information, location history, and any other user data objects that may be stored in the system, the social network manager employs certain privacy and security functions to limit access to user information to only the user and authorized members. In one embodiment, each user account is identified by a unique user ID and protected by an associated password known only to the user. User account information is typically stored on the server computer in the form of database tables, such as in user database 124. Other information relating to the users are maintained in separate database tables on the server computer. These can include the location history, friends list, profile information, account information, or any other items of information managed by the system.

FIG. 13 illustrates an example of a user table and an associated location history table, under an embodiment. The user table 1302 contains the listing of the users with certain key information, such as name, user ID, and phone number, among other possible identification information. Certain databases within the system store sensitive user information, such location information and dating preferences, and the like. To ensure privacy and security, these tables are not explicitly associated with any particular user. This ensures that anyone gaining unauthorized access to the databases within the system will not be able to associate any particular sensitive information with the corresponding user. This correspondence is provided only by way of an encoded linkage structure. Thus, as illustrated in FIG. 13, there is a code denoted "linkA" for each user. When a user is created within the system, the unique linkA code is generated for that user. It is a randomly generated alpha-numeric text string that is unique to each user. The user also provides a password, which is not itself is not stored within the system, but is instead used to encode or link the table entries in the user table 1302 to other data objects in the user's database. Thus, in one embodiment, the linka code is used by the system to link to other database tables holding sensitive or confidential information for the user within the system.

Table 1304 in FIG. 13 shows the relationship between a location history table for the users listed in the user table 1302. In one embodiment, the linkA code is hashed with the user password to create a second reference code denoted "linkB" that associates the data within table 1302 with the respective user in table 1304. Thus, as shown in FIG. 13, the location history for each user is associated back to the user through the association created by linkA and linkb. No user name or identifier information is stored in the location history table, only the linkb parameter is used to associate entries in the second table with the user table. The user-specified password is not stored in any table, and if it is lost, the associated tables cannot be recovered. All secondary link codes are updated when a user changes his or her password.

Although FIG. 13 shows an example in which a location history table is associated with the user table, it should be noted that any other database table or data structure within the system can also be protected using the same type of linkage mechanism that utilizes a hash function based on the user password or similar protection string.

Because the social networking system can provide location and location history information for individual members of a network, certain privacy and security features are provided to allow a user to mask or hide a user's actual location information, or limit access to the user's location information. In one embodiment, a fuzzy location feature is provided. This function adds a random offset to the actual location of a user, and allows the user to share his general location information with other users but hide his exact location. For example, the offset could be one mile, thus the user's location would be offset by a mile when displayed on another user's mobile communication device. The offset value is used until the user moves out of the offset radius. The offset value is then reset and used until the user moves outside of the boundaries defined by the previous or new offset value. The user is randomly displayed in any location within the offset radius, and can be displayed as a large icon encompassing the entire fuzzy area or as a focused icon randomly placed within the radius. This prevents other users from being able to guess a user's location by selecting the location in the middle of several densities.

In certain deployments, such as those involving many mobile device users based around one or more server computers, the amount of data transmitted throughout the system can be very high. If many users constantly change location and/or message other users on a frequent basis and at approximately the same time, the network traffic could easily overwhelm the system causing lock-up conditions or drastic slowing of network traffic. In one embodiment, the location-based social network manager process employs a data compression mechanism to compress the location and message data to reduce the network traffic between the mobile devices and the server computer. The data compression mechanism, according to one embodiment recognizes frequently used patterns and assigns them a number between 0 and 255. These patterns can thus be represented in one-byte. A dictionary of the 256 most frequently used patterns is generated and stored on one or both of the server and client devices and shared between the client and server. In alternative embodiments, other known data compression methods can be used to compress the network traffic between the server computer and the client computers and mobile communication devices.

Revenue Model

In one embodiment, the location-based social network manager can incorporate or be used as a platform for a revenue-based social networking business system. One or more aspects of the process will involve fee-based services that generate income for any of the service providers and/or users. For example, a fee could be charged to each user every time a location fix is provided and displayed for the user's friends on his or her mobile communication device, or every time a message is sent or received from the user's friends. Revenue generating aspects can also be associated with the POI feature. For example, a fee could be charged to a user for accessing and displaying a POI on the mobile communication device. For commercial places of interest, a fee might be charged to the business for displaying the location on the user's mobile communication device. Likewise, fees could be charged for the transmission of advertising messages to the users in a network. Such ads could be associated directly with particular places of interest, or they could be streamed to the user's through an ad serving service, or the like. Various different revenue models can be implemented with the fee structure defined and controlled by the server computer administrator. Any revenue received through the use of service fees, message fees, advertising fees, subscription/membership fees, and the like can be retained by the system administrator or shared among the parties in a manner defined by the administrator.

In one embodiment, each user of a mobile communication device establishes an account with the server computer to set up the appropriate databases and establish communication with the server computer. This account mechanism establishes a membership system whereby users who can share their location information are all "members" of the network defined by the location-based social network process. In a typical deployment, the membership is free for the users. Alternatively, each user can be charged a periodic or one-time membership fee to use the social network process. In general, each member logs into the server computer individually to establish and manage their account. In one embodiment, the social network process includes a invitation mechanism that allows established users to invite non-members to the service. In this embodiment, the member user sends the phone number, e-mail address, or other contact information for the non-member to the server computer. The server computer then sends a client application (or applet) to the non-member user. The client application prompts the non-member to fill in certain fields to activate his or her new account. Upon providing the proper information, a new account is set up and this person is part of the network. The inviting member is automatically added as a friend in the new member's friends database.

Embodiments of the location-based social network manager process described herein may be applied to various types of computer and mobile device networks utilizing communication over the Internet or similar distributed network protocols.

Aspects of the mobile communication device location display system described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects of the process include: microcontrollers with memory (such as EEPROM), embedded microprocessors, firmware, software, etc. Furthermore, aspects of the described process may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the location-based social network manager process is not intended to be exhaustive or to limit the embodiments to the precise form or instructions disclosed. While specific embodiments of, and examples for, the process and system are described herein for illustrative purposes, various equivalent modifications are possible within the scope of the described embodiments, as those skilled in the relevant art will recognize.

The elements and acts of the various embodiments described above can be combined to provide further embodiments. These and other changes can be made to the location-based social network manager process in light of the above detailed description.

In general, in any following claims, the terms used should not be construed to limit the described system to the specific embodiments disclosed in the specification and the claims, but should be construed to include all operations or processes that operate under the claims. Accordingly, the described system is not limited by the disclosure, but instead the scope of the recited method is to be determined entirely by the claims.

While certain aspects of the location-based social network manager process are presented below in certain claim forms, the inventor contemplates the various aspects of the methodology in any number of claim forms. For example, while only one aspect of the system is recited as embodied in machine-readable medium, other aspects may likewise be embodied in machine-readable medium. Accordingly, the inventor reserves the right to add additional claims after filing the application to pursue such additional claim forms for other aspects of the described systems and methods.

What is claimed is:

1. A mobile communication device comprising:
   a network interface configured to allow the mobile communication device to communicate with one or more other mobile communication devices over a network;
   a geographic location circuit coupled to the network interface and configured to determine the location of the device relative to a terrestrial coordinate system;
   a graphical user interface including a display area allowing output of information to a user of the device;
   a map generation circuit configured to display a map encompassing an area around the location of the device on the graphical user interface, wherein the map generation circuit displays geographic location information on the display area for any of the one or more other mobile communication devices that are within a predefined range of the device and that are in communication with the device over the network wherein the graphical user interface comprises a first sub-display area displaying the map and a second sub-display area displaying identification information relating to respective users of the one or more other mobile communication devices; and
   a filter circuit configured to allow a user of the mobile communication device to limit sharing of geographic location information to certain users of the one or more other mobile communication devices by preventing display of the geographic location information on the displays of the mobile communication devices of users who are not selected as able to share the geographic location information.

2. The mobile communication device of claim 1 wherein the network comprises a cellular telephone network, and wherein the device and each of the one or more other mobile communication devices comprises a location aware cellular telephone.

3. The mobile communication device of claim 1 wherein the terrestrial coordinate system comprises a latitude/longitude coordinate system, and wherein the geographic location device comprises one of a global positioning system circuit, a WiFi circuit, and a mesh network circuit capable of determining a position of the device to within a predetermined radius of a given latitude/longitude position of the device.

4. The mobile communication device of claim 3 wherein the graphical user interface updates the geographic location information for the one or more other mobile communication device that are displayed on the display area and modifying their displayed position on the map as they move within the area around the location of the device.

5. The mobile communication device of claim 4 further comprising a global positioning system polling circuit configured to periodically check the geographic location of the one or more other mobile communication devices within the area.

6. The mobile communication device of claim 5 wherein the location of the one or more other mobile communication devices is updated on the map by updated location information determined by the global positioning system polling circuit, and wherein the polling period is dynamically determined in accordance with the frequency of movement of the device within the area.

7. The mobile communication device of claim 1 wherein the map generation circuit is further configured to display a static point of interest within the predefined range.

8. The mobile communication device of claim 4 wherein the map generation circuit is further configured to display an event location of an event occurring within a predefined time period, wherein the event location is within the predefined range.

9. The mobile communication device of claim 1 further comprising an alert circuit configured to generate an alert upon detection of a particular other mobile communication device within the area around the location of the device.

10. The mobile communication device of claim 9 further comprising an auto message circuit configured to automatically send a message to the particular mobile communication device upon entering the area around the location of the device.

11. The mobile communication device of claim 1 further comprising a message transmission circuit coupled to the network interface and configured to transmit a message from the device to at least one of the other mobile communication devices displayed on the graphical user interface through the network interface.

12. The mobile communication device of claim 1 wherein the location of the user and the one or more other mobile communication devices that are within a predefined range of the device are displayed on the map as respective icons superimposed on the map.

13. The mobile communication device of claim 1 further wherein the second sub-display comprises a pop-up window displayed proximate an icon indicating the user's location, and enabled by a toggle switch activated by the user.

14. The mobile communication device of claim 13 wherein the identification information comprises at least one of a user name, address, telephone number, and relative distance to the device within the area.

15. The mobile communication device of claim 13 wherein the location of each individual mobile communication device of the one or more other mobile communication devices is displayed on the map as a unique characteristic including at least one of color, shape, and size.

16. The mobile communication device of claim 15 further comprising a persistent memory store, the memory store storing a tabulated database listing the identification information for the respective users of the one or more other mobile communication devices.

17. The mobile communication device of claim 16 wherein the database listing stores historical location information for each of the one or more other mobile communication devices.

18. The mobile communication device of claim 16 further comprising a reverse geocoding component configured correlate the user's location to a nearest place of interest having a location stored in a database accessible to the mobile communication device of the user.

19. The mobile communication device of claim 1 further comprising a zoom and pan circuit configured to change the resolution of the map displayed on the graphical user interface and allow spatial repositioning of the map within the display area of the graphical user interface.

20. A method comprising:
determining the geographic location of a first mobile communication device operated by a first user within an area;
determining the geographic location of a second mobile communication device operated by a second user within an area;
displaying a map representation of the area around the first user on a display of the first mobile communication device, and a map representation of the area around the second user on a display of the second mobile communication device;
transmitting the geographic locations of the first and second mobile communication devices to a server computer coupled to the first and second mobile communication devices;
transmitting from the server computer, the geographic location of the first mobile communication device to the second mobile communication device upon a first triggering event;
transmitting from the server computer, the geographic location of the second mobile communication device to the first mobile communication device upon a second triggering event;
displaying on the display of the first mobile communication device the location of the second mobile communication device comprising a first sub-display area displaying a map and a second sub-display area displaying identification information relating to the second mobile communication device;
displaying on the display of the second mobile communication device the location of the first mobile communication device; and
defining privacy filters in the first and second mobile communication devices that allow location information of the first or second mobile communication device to not be displayed on the other mobile communication device.

21. The method of claim 20 wherein the network comprises a cellular telephone network, and wherein the device and each of the one or more other mobile communication devices comprises a location aware cellular telephone.

22. A system comprising:
a first network coupling a plurality of mobile communication devices together; a second network coupling a plurality of client computers together; a server computer coupled to the first network and configured to communicate to the plurality of mobile communication devices through a first intermediate server, and coupled to the second network and configured to communicate to the plurality of client computers through a second intermediate server, the server computer executing a process configured to:
determine a location of each mobile communication device coupled to the first network, and
maintain a database for each respective user of the plurality of mobile communication devices, the database specifying the identity of other users who are allowed to share the location information of the user, wherein the location of the other users relative to the user is displayed on a graphical user interface of the mobile communication device of the user in accordance with one or more preference filters stored in the database wherein the graphical user interface comprises a first sub-display area: displaying the map and a second sub-display area displaying identification information relating to respective users of the one or more other mobile communication devices.

23. The system of claim 22 wherein the server computer and mobile communication device execute a synchronization routine to synchronize location information updates for the plurality of mobile communication devices.

24. The system of claim 23 wherein the network comprises a cellular telephone network, and wherein the each of the mobile communication devices comprises a location aware cellular telephone.

25. The system of claim 24 wherein each mobile communication device determines its location and transmits its location information to the server computer to create updated location information stored in a database accessible to the server computer.

26. The system of claim 25 wherein the updated location information is stored and transmitted to a requesting mobile communication device upon a request for service from the server computer by the requesting mobile communication device.

27. A mobile communication device comprising:
a network interface configured to allow the mobile communication device to communicate with one or more other mobile communication devices over a network;
a geographic location circuit coupled to the network interface and configured to determine the location of the device relative to a terrestrial coordinate system;
a graphical user interface including a display area allowing output of information to a user of the device;
a map generation circuit configured to display a map encompassing an area around the location of the device on the graphical user interface, wherein the map generation circuit displays geographic location information on the display area for any of the one or more other mobile communication devices that are within a predefined range of the device and that are in communication with the device over the network, wherein the graphical user interface comprises a first sub-display area displaying the map and a second sub-display area displaying identification information relating to respective users of the one or more other mobile communication devices, wherein the location of the user and the one or more other mobile communication devices that are within a predefined range of the device are displayed on the map as respective icons superimposed on the map; and
a filter circuit configured to allow a user of the mobile communication device to limit sharing of geographic location information to certain users of the one or more other mobile communication devices by preventing display of the geographic location information on the displays of the mobile communication devices of users who are not selected as able to share the geographic location information.

28. The mobile communication device of claim 27 wherein the network comprises a cellular telephone network, and wherein the device and each of the one or more other mobile communication devices comprises a location aware cellular telephone.

29. The mobile communication device of claim 27 wherein the terrestrial coordinate system comprises a latitude/longitude coordinate system, and wherein the geographic location device comprises one of a global positioning system circuit, a WiFi circuit, and a mesh network circuit capable of determining a position of the device to within a predetermined radius of a given latitude/longitude position of the device.

30. The mobile communication device of claim 29 wherein the graphical user interface updates the geographic location information for the one or more other mobile communication device that are displayed on the display area and modifying their displayed position on the map as they move within the area around the location of the device.

31. The mobile communication device of claim 30 further comprising a global positioning system polling circuit configured to periodically check the geographic location of the one or more other mobile communication devices within the area.

32. The mobile communication device of claim 31 wherein the location of the one or more other mobile communication devices is updated on the map by updated location information determined by the global positioning system polling circuit, and
wherein the polling period is dynamically determined in accordance with the frequency of movement of the device within the area.

33. The mobile communication device of claim 31 wherein the map generation circuit is further configured to display art event location of art event occurring within a predetermined time period, wherein the event location is within the predefined range.

34. The mobile communication device of claim 27 wherein the map generation circuit is further configured to display a static point of interest within the predefined range.

35. The mobile communication device of claim 27 further comprising an alert circuit configured to generate an alert upon detection of a particular other mobile communication device within the area around the location of the device.

36. The mobile communication device of claim 35 further comprising an auto message circuit configured to automatically send a message to the particular mobile communication device upon entering the area around the location of the device.

37. The mobile communication device of claim 27 further comprising a message transmission circuit coupled to the network interface and configured to transmit a message from the device to at least one of the other mobile communication devices displayed on the graphical user interface through the network interface.

38. The mobile communication device of claim 27 further wherein the second subdisplay comprises a pop-up window displayed proximate an icon indicating the user's location, and enabled by a toggle switch activated by the user.

39. The mobile communication device of claim 27 wherein the identification information comprises at least one of a user name, address, telephone number, and relative distance to the device within the area.

40. The mobile communication device of claim 27 wherein the location of each individual mobile communication device of the one or more other mobile communication devices is displayed on the map as a unique characteristic including at least one of color, shape, and size.

41. The mobile communication device of claim 40 further comprising a persistent memory store, the memory store storing a tabulated database listing the identification information for the respective users of the one or more other mobile communication devices.

42. The mobile communication device of claim 41 wherein the database listing stores historical location information for each of the one or more other mobile communication devices.

43. The mobile communication device of claim 27 further comprising a reverse geocoding component configured correlate the user's location to a nearest place of interest having a location stored in a database accessible to the mobile communication device of the user.

44. The mobile communication device of claim 27 further comprising a zoom and pan circuit configured to change the resolution of the map displayed on the graphical user interface and allow spatial repositioning of the map within the display area of the graphical user interface.

* * * * *